United States Patent [19]

Bourne

[11] Patent Number: 4,869,459
[45] Date of Patent: Sep. 26, 1989

[54] VALVE OPERATORS

[76] Inventor: Douglas A. Bourne, 466 W. Valley Stream Blvd., Valley Stream, N.Y. 11580

[21] Appl. No.: 183,890

[22] Filed: Apr. 20, 1988

[51] Int. Cl.$^4$ ............................................. F16K 31/12
[52] U.S. Cl. ....................................... 251/58; 251/294; 251/280; 74/424.8 VA; 267/173; 92/137
[58] Field of Search ................ 251/58, 293, 294, 279, 251/280; 74/424.8 VA; 92/130, 137; 267/172, 173

[56] References Cited

U.S. PATENT DOCUMENTS

| | | | |
|---|---|---|---|
| 339,888 | 4/1886 | Hinds | 251/68 |
| 2,178,122 | 10/1939 | Ostler et al. | 267/172 |
| 2,196,969 | 4/1940 | Berger | 92/137 |
| 2,266,836 | 12/1941 | Weidner | 137/531 |
| 2,906,524 | 9/1959 | Oakes et al. | 267/173 |
| 2,947,019 | 8/1960 | Liesse | 267/172 |
| 3,014,463 | 12/1961 | Krohm | 92/137 |
| 3,051,143 | 8/1962 | Nee | 92/130 |
| 3,121,371 | 2/1964 | Graham | 92/137 |
| 3,177,975 | 4/1965 | Galli | 267/172 |
| 3,267,816 | 8/1966 | Graham | 92/130 |
| 3,267,817 | 8/1966 | Adams | 92/137 |
| 3,480,200 | 11/1969 | Rohrer | 92/137 |
| 4,206,900 | 6/1980 | Willis | 251/280 |
| 4,225,110 | 9/1980 | Akkerman et al. | 92/137 |
| 4,248,104 | 2/1981 | Wood, III | 251/251 |
| 4,261,379 | 4/1981 | Berry | 137/39 |
| 4,270,849 | 6/1981 | Kalbfleisch | 251/313 |
| 4,285,493 | 8/1981 | Willis | 251/280 |
| 4,527,769 | 7/1985 | Stogner et al. | 251/279 |
| 4,553,731 | 11/1985 | Carpenter | 251/233 |

OTHER PUBLICATIONS

Anderson, "Rotary Actuators For Quarter Turn Valves", Chemical Engineering, 08/15/88, pp. 143–151.
*Rota-Cyl Rotary Actuators*, Deltrol Corp., Bul. No. 1923-1, Aug. 1978, pp. 12, 18, 20.
*Rex Hanna Cable Air Cylinders*, Rex Hanna Chainbelt Inc., Bul. No. 778, Dec. 1967.

*Primary Examiner*—A. Michael Chambers

[57] ABSTRACT

A spring return valve operator for actuating a valve is comprised of a spring return actuator which is load-matched to a valve load and extracts a large fraction of its spring energy storage capacity, and a controlled actuator which is load matched to the valve load and the spring return actuator retensioning load. Within the spring return actuator, the output of nested torsion springs is transformed into various torque outputs, particularly constant torque outputs and increasing torque outputs. Spring output is transformed by eccentric spool and flexible element mechanisms or by four bar mechanisms through changes in leverage produced by varying torque arms. The output of a controlled actuator can be transformed into torque outputs which are decreasing, increasing, etc., using eccentric spool and flexible element mechanisms or using four bar mechanisms in order to produce a loadmatch to the valve load. A pneumatic controlled actuator, comprised of a piston, push rod, concentric spool and flexible elements which oppositely wrap on the concentric spool and connect to the piston and the push rod, produces a constant torque output and no side thrusting of the piston, is not subject to fouling of the flexible element, and can be used as either a single or double acting actuator.

A high fatigue life spooling cable connection, which is comprised of a self adjusting multiple leg cable, is used in the spring return actuator and the pneumatic controlled actuator.

49 Claims, 11 Drawing Sheets

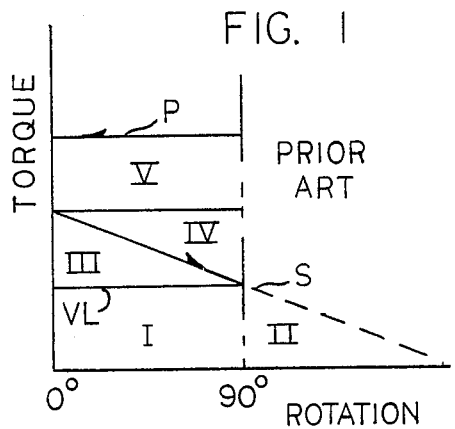
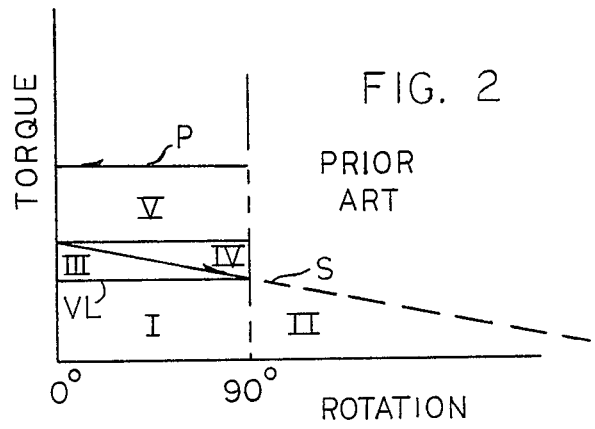
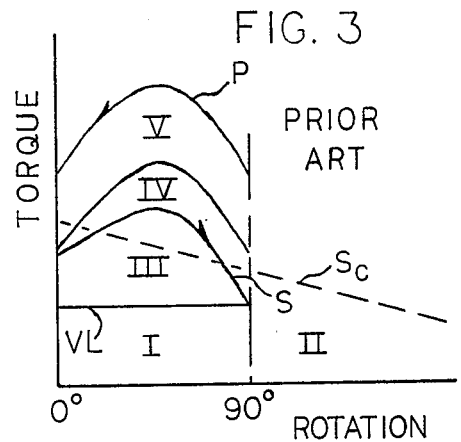
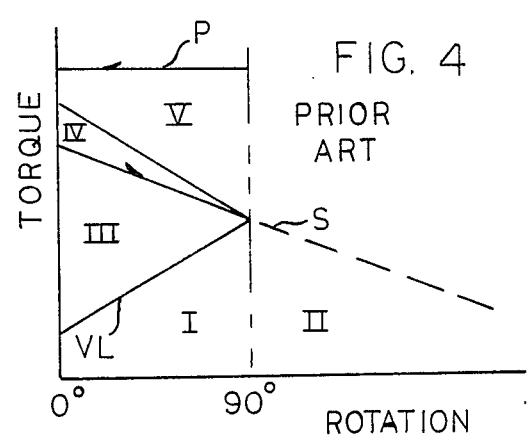
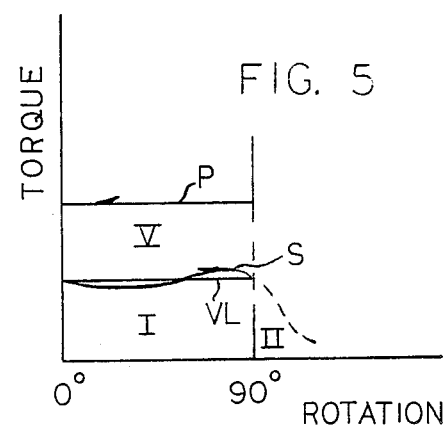
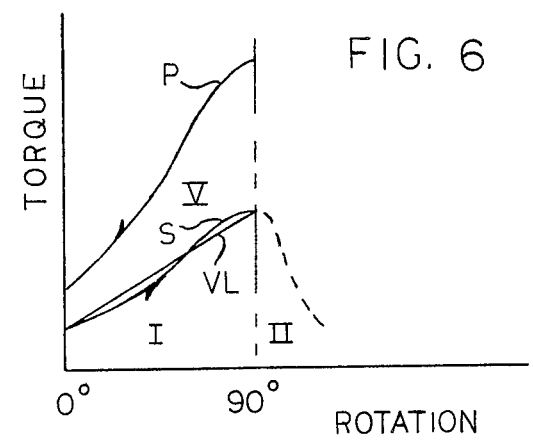

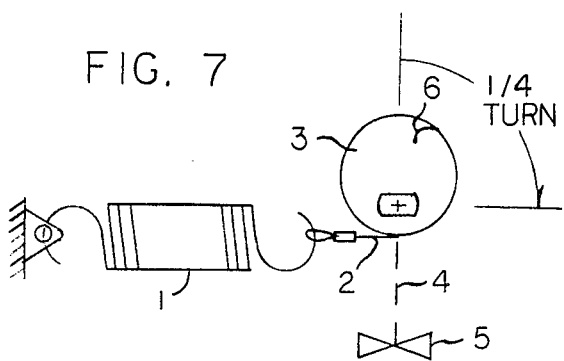
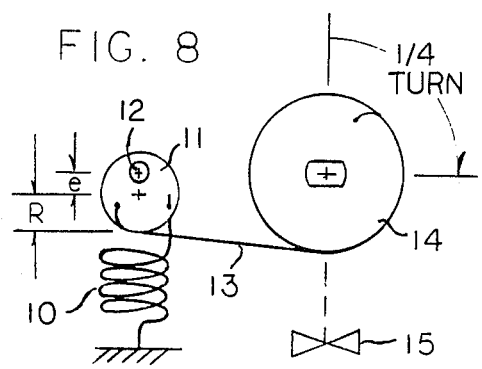
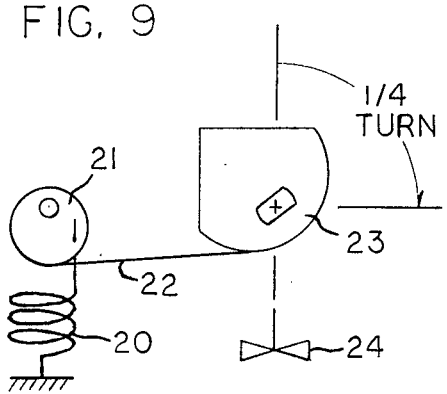
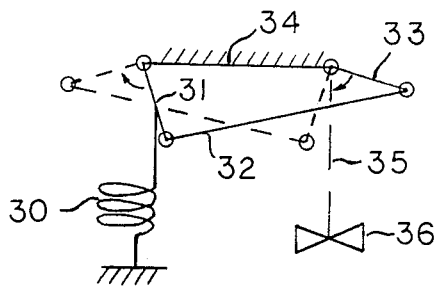
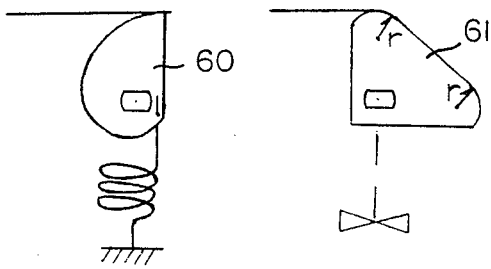
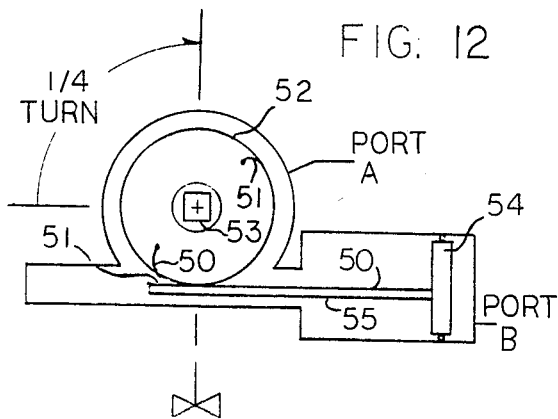

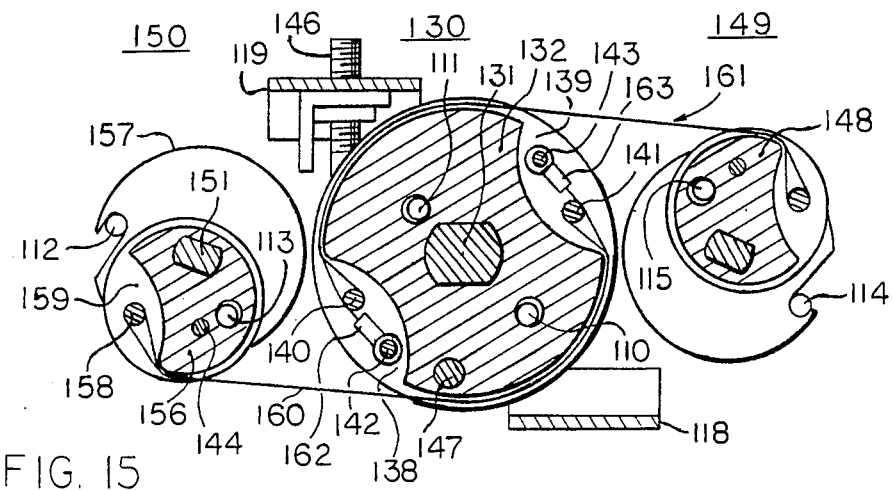
FIG. 15
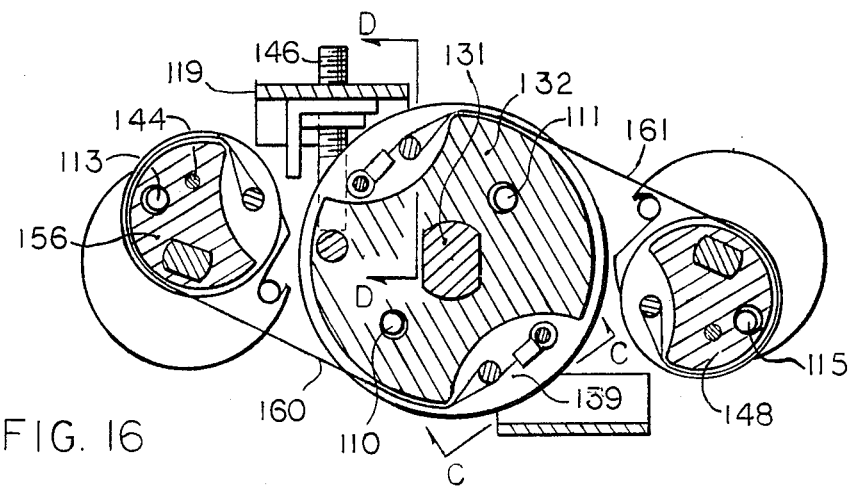
FIG. 16
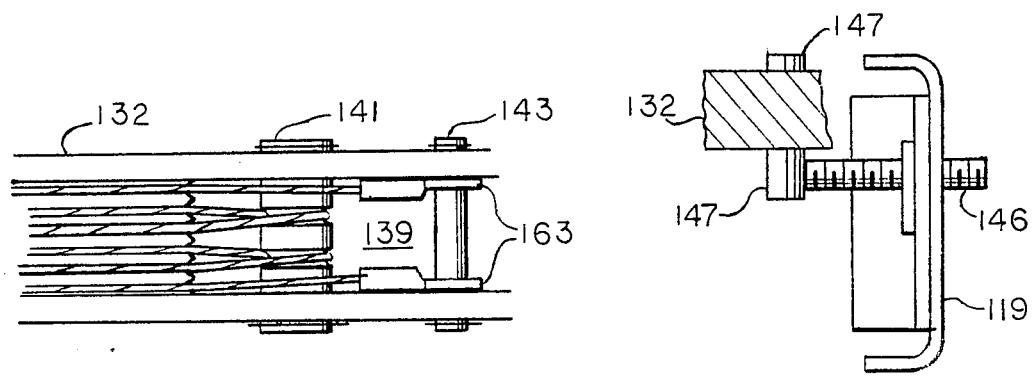
FIG. 17
FIG. 18

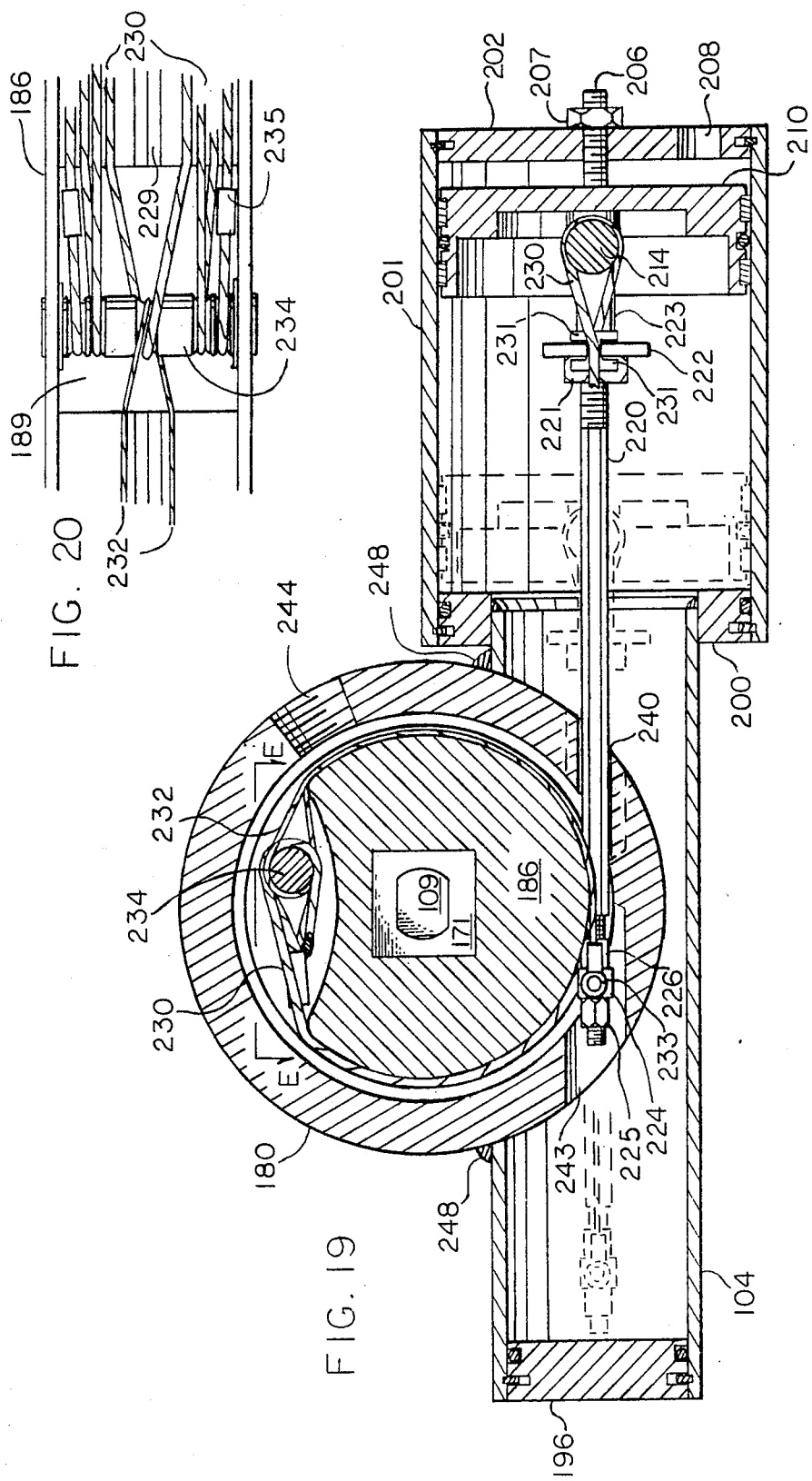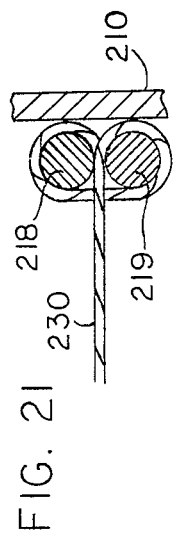

FIG. 26
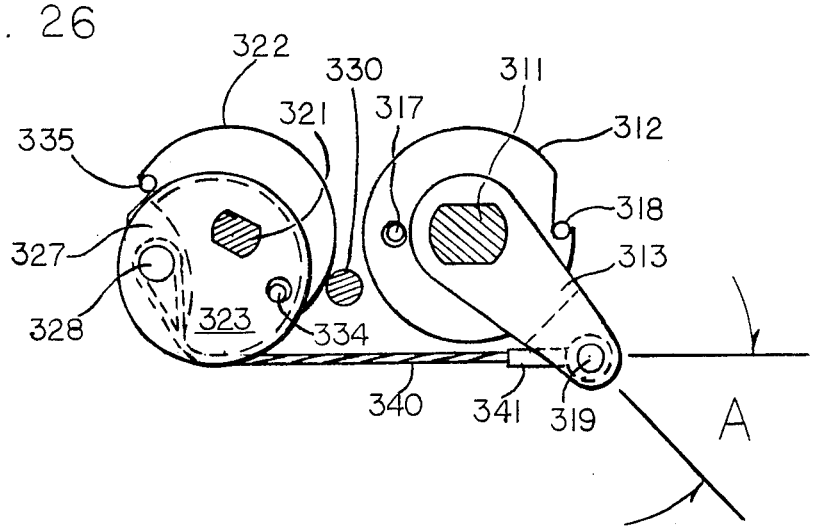
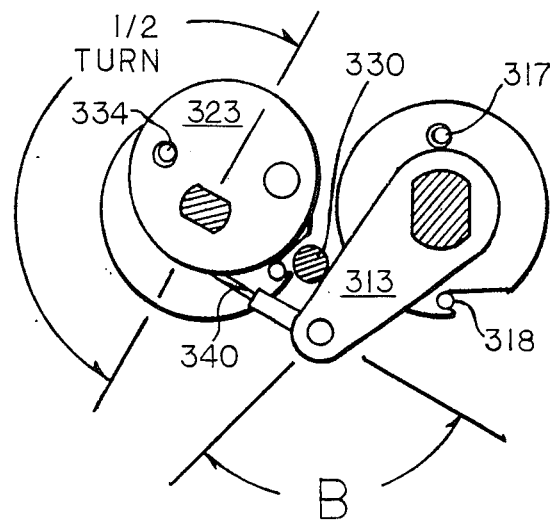
FIG. 27

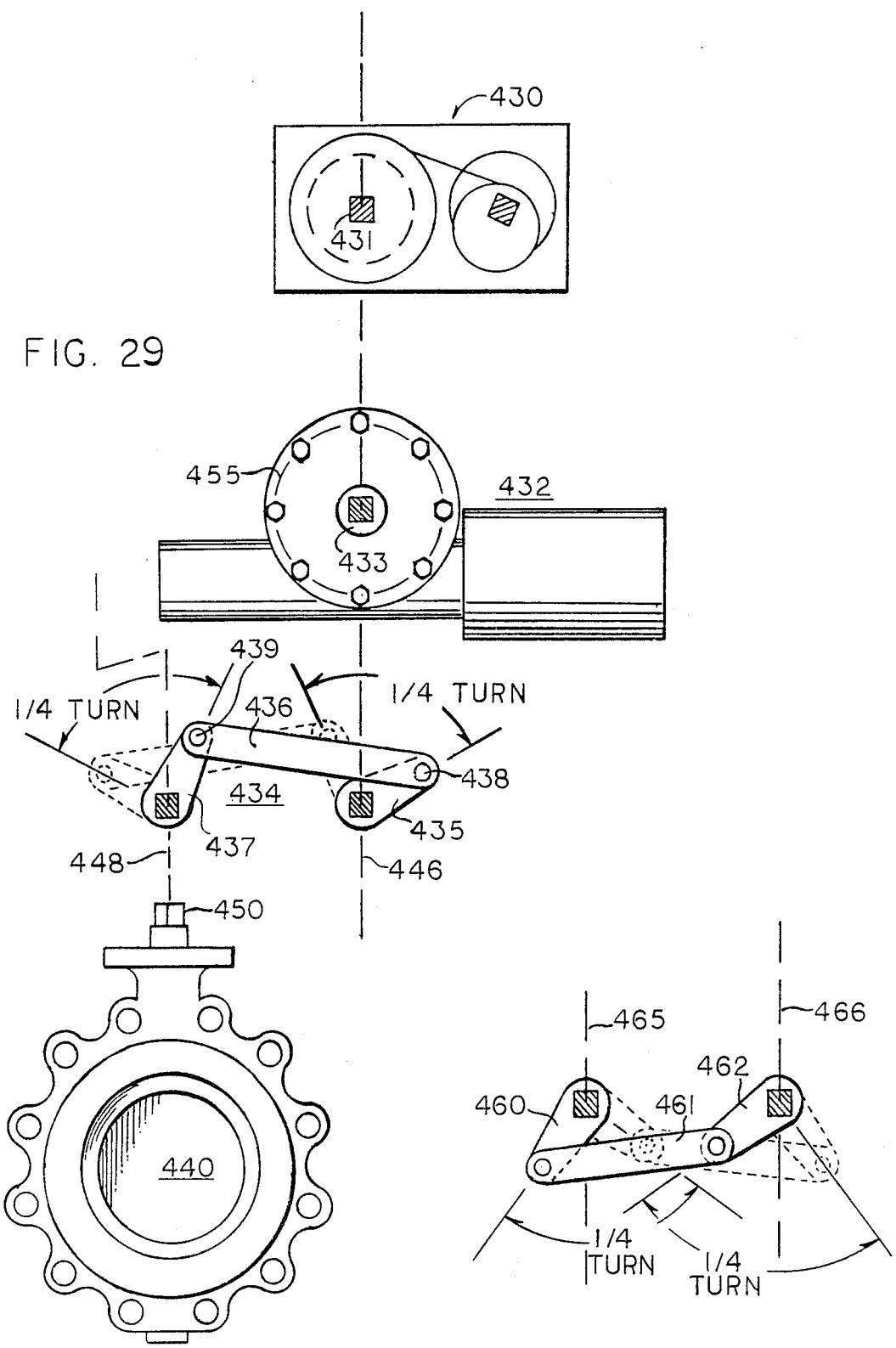

VALVE OPERATORS

BACKGROUND OF THE INVENTION

This invention relates to valve operators and in particular to spring return valve operators which incorporate varying torque arm devices in the form of spools and flexible elements and also in the form of four bar linkage.

Spring return actuators are typically combined with controlled actuators such as pneumatic actuators, other fluid power actuators, electric actuators, or manual actuators to form failsafe valve operators. Failsafe valve operators protect against the failure of the control signal or the energy source for the controlled actuator and the subsequent possible hazards by returning the valve being controlled to a relatively safe operating position. The more well known hazards include fires, explosions and releases of toxic substances which have led to loss of life and property and to contamination of the environment, all of which is of increasing concern to industry, government, and the public. Spring return actuators are also combined with controlled actuators such as release and manual reset actuators to form valve operators for various safety type trip valves which are responsive to various process or environmental hazard conditions.

The prior art teaches making a pneumatic spring return valve operator by placing a spring power element consisting of one or more compression springs inside a pneumatic cylinder where it can act on the piston or by placing a compression spring outside the pneumatic cylinder where it can act on the piston rod. Such a combination is then used directly on sliding stem valves. For operating rotary valves such as quarter turn ball or butterfly valves, a linear to rotary motion converter mechanism is additionally provided in the valve operator. Well known linear to rotary motion converter mechanisms in the prior art include the slider crank, scotch yoke, rack and pinion, and various types of trunnion and clevis mounts.

Manually operated spring return actuators known in the prior art are generally limited to the smaller quarter turn valves and are based on compression springs or direct rotary motion springs.

There are a number of drawbacks to valve operators in the prior art due to interrelated problems with the character of the valve load, spring actuator output and controlled actuator output, with the efficiency with which the spring actuator is used, and with the size, weight and cost of the valve operator. These problems have caused spring return valve operators to be rather large heavy and expensive pieces of equipment.

Different kinds of valves present different types of loads to a valve operator. The valve load typically includes some factor of safety to assure reliable actuation of the valve. Some typical valve loads which are encountered include constant loads, high breakaway loads, loads which have high intermediate peaks, loads which decrease and then increase, etc. For example, quarter turn butterfly valves, depending on how the butterfly seats against the seals, can produce loads which increase, are constant, or are constant with a large increase at the end, as the valve moves toward the closed position. In addition, because of fluid pressure torqueing of the butterfly in some designs, the opening load can be different from the closing load. Quarter turn ball valves are generally taken as having a constant torque load for valve operator sizing purposes, although the load actually can dip somewhat in the middle of the actuation stroke and sometimes has a higher breakaway.

Within a valve operator in the prior art, a spring return actuator will produce a declining output as it actuates a valve. Typically, the extent of the decline is in the range of 20% to 50%. On the other hand, a pneumatic cylinder actuator will produce a constant force output. A vane actuator or a simple handle will produce a torque output which is approximately constant. Some of the linear to rotary motion converter mechanisms, such as the slider crank or the scotch yoke, will distort the output of pneumatic cylinder actuators and spring return actuators. For example, a pneumatic cylinder acting through a crank on a quarter turn valve will generate about 30% less torque at the beginning and end of actuation than in the middle. A rack and pinion type linear to rotary converter mechanism, on the other hand, generates a constant torqueing radius and thus the output torque bears a constant relation to the input force.

As a result, spring return actuators are not loadmatched to the valves that they operate and controlled actuators are not loadmatched to the spring return actuators that they have to retension and often are not loadmatched to the valve loads either. As the output of the spring return actuator must be greater than or equal to the valve load throughout actuation of the valve, this results in a spring return actuator which is, for the most part, oversized. Additionally, as the output of the controlled actuator must be greater than or equal to the maximum value of the valve load plus the retensioning load of the spring return actuator, this results in an oversized controlled actuator. The degree of valve load to actuator output mismatch represents excess actuator capacity. This excess capacity can have harmful side effects because high actuation accelerations and velocities in the valve can eventually damage the valve.

The degree of mismatch has been reduced in some prior art valve operators through the use of lower rate springs. There is, however, a direct tradeoff in the prior art between spring actuator size and weight versus degree of loadmatching. A lower rate spring which can meet a given valve load will be larger and heavier than a higher rate spring, but the higher rate spring will be less well loadmatched to the valve load and to the output of the controlled actuator than the lower rate spring thus forcing the use of a larger size controlled actuator. Additionally, the higher rate spring and the larger controlled actuator both increase the possibility of overstressing the valve. The situation in the prior art is further troubled by the fact that when a lower rate spring is used, much of the spring actuator capacity is used to maintain a preload. For example, I calculate that a spring actuator which is descirbed by Hooke's Law and undergoes a 20% change in deflection or decline in output during actuation, releases only 36% of of its energy. The use of high preloads not only represents excess capacity but also, in larger size valve operators, poses a safety problem to maintenance personnel having to release or apply such a preload.

I have attempted to summarize and illustrate in graph form the above problems and tradeoff in the prior art. FIG. 1 shows a plot of the output and load characteristics of a pneumatic spring return rack and pinion quarter turn valve operator and a constant torque load quarter turn valve. Line 'VL' is the valve load. Line 'S' is the spring actuator output and retensioning load as described by Hooke's Law. Line 'P' is the pneumatic actuator output. Areas I, II and III taken together are a measure of the total energy storage capacity of the spring return actuator. Area I is the portion of the spring actuator energy capacity used to meet the valve load. Area II is the portion of the spring actuator energy capacity which is returned as preload and represents excess capacity because it is not used. Area III is the portion of the spring actuator energy capacity which is in excess of the valve load requirements and thus represents excess capacity. Areas I, III, IV and V taken together are the total amount of energy produced by the pneumatic actuator. Areas I and III are the portion of the pneumatic actuator energy capacity used to meet the spring actuator retensioning load but area III represents excess pneumatic actuator capacity because it restores excess spring actuator capacity. Area V is the portion of the pneumatic actuator energy capacity used to meet the valve load. Area IV is the portion of the pneumatic actuator energy capacity which is in excess of the valve load and spring actuator retensioning load requirements and thus represents excess capacity.

FIG. 2 shows the effect of using a lower rate spring, than that of FIG. 1, in the spring return actuator. While the maximum output of the spring return actuator has decreased and the output of the controlled actuator can in turn be decreased thereby decreasing the size of areas III and IV, the size of the spring and the preload energy, area II, have increased considerably.

The use of other linear to rotary converter mechanisms generally worsens the load mismatch and excess capacity problem in the prior art. FIG. 3 shows a pneumatic spring return actuator which acts through a slider crank. Line 'Sc' is the torque output which would be generated by the spring actuator if the spring acted through a constant torque radius and through the same stroke. It shows the greater spring actuator capacity needed.

A valve, such as a butterfly valve, which presents an increasing load to a spring return actuator of the prior art will result in further load mismatch, as shown in FIG. 4.

The areas of excess actuator capacity are inherent and necessary in the prior art spring return valve operators in order to meet valve loads. In light of the invention, however, these areas of excess actuator capacity will be seen as unnecessary and wasted actuator capacity.

In addition the large size and weight of prior art spring return valve operators frequently results in considerable installation problems and costs. Often, pipes are of insufficient strength to support the large extra weight of a spring return valve operator and therefore extra supporting structure must be provided. Also, spring return valve operators frequently must be installed in confined places where the cost of providing extra space to accomodate the valve operator is high, as for example on a valve down in an underground vault or on a valve up in closely spaced pipe racks.

SUMMARY OF THE INVENTION

The primary objectives of the invention are:

1. provide simple, compact, reliable and low cost devices and interconnections for loadmatching spring return actuators to valve loads and minimizing the level of preload in spring return actuators 2. provide interconnections and devices for loadmatching a controlled actuator to a valve load and a spring return actuator load 3. provide a quarter turn spring return valve operator which produces a constant torque output in both directions 4. provide a compact spring return actuator 5. provide a pneumatic actuator which can deliver a constant torque, is of simple construction, reliable and eliminates side thrusting of the piston 6. reduce the size, weight and cost per unit output of spring return valve operators through the reduction of excess actuator capacity The basic gist of the invention is to provide devices, interconnections and methods for getting around the previously described problems in the prior art and thereby substantially remove the need for excess actuator capacity and gain significant reductions in the size, weight and cost of the spring return valve operators needed to meet given valve loads through the reduction or substantial elimination of excess actuator capacity. These device, interconnections and methods then will more closely loadmatch the spring return actuator to the valve load, leave a smaller fraction of the spring energy as preload, and more closely loadmatch the controlled actuator to the spring retensioning load and to the valve load. This will make the spring return actuator output approximately equal to the valve load throughout actuation toward the returned position and make the controlled actuator output approximately equal to twice the valve load throughout actuation away from the returned position and toward the retensioned position. By definition, the spring return actuator always actuates from the retensioned position to the returned position and the controlled actuator always actuates from the returned position to the retensioned position. The returned position of the valve operator is generally made to coincide with either the opened or closed position of the valve. FIGS. 5 and 6 illustrate in graph form the outputs of valve operators according to the invention for valve loads which are constant and increasing toward the returned position, respectively. In the case where the valve load in one direction is different from the valve load in the opposite direction, then the spring return actuator and the controlled actuator will be matched to the respective loads on which they act.

In this invention then, a spring or set of springs acts through an eccentric spool (e.g. sheave, sprocket, pulley, etc.) or some other spool of varying radial dimension (e.g. spiral shaped 60, smoothly faired in curves and lines 61, as shown in FIG. 11) and a flexible element (e.g. cable, roller chain, leaf chain, belts, etc.) which wraps on or forms a wrapped connection with the eccentric spool. Alternatively, the spring may act through a four bar linkage. Each of these devices is used to generate a varying torque arm as it moves, thereby creating a varying amount of leverage, mainly increasing leverage, which is used to transform and transmit the bias from the spring to a valve in order to actuate that valve in a loadmatched manner to the returned position. The eccentric spool generates a varying torque arm by drawing the flexible element closer to or further away from the axis of rotation of the eccentric spool as the flexible element wraps or unwraps therefrom. The four bar linkage generates a varying torque arm through changes in cross product angles within the linkage. The varying leverage not only has the effect of transforming the output actuation characteristics of the spring, but also its input retensioning characteristics. For instance, the declining output bias of a spring can be transformed into an output which is approximately constant, increasing, increasing and then decreasing thus providing an intermediate peak output, decreasing and then constant, decreasing and then increasing, constant and then increasing, decreasing at a slower rate, etc. The variation of the leverage can be selected such that the spring output is transformed to approximately match the load of the valve thereby eliminating excess spring actuation energy. If in addition, the spring output is allowed to decline substantially during actuation while being transformed by the varying leverage so as to match the valve load, then much of the energy can be extracted from the spring thereby significantly reducing excess spring preload energy.

For example, to produce a constant torque spring return actuation, then as the spring output declines the eccentric or four bar is set up to produce a leverage which increases proportionately. If in addition, the spring output is allowed to fall to 50% or 25% of of maximum output while the leverage is made to increase two or four times respectively in order to maintain a constant output, then I calculate that the energy released by the spring, when the output of the spring can be described by Hooke's Law, is 75% or 94% respectively of the maximum energy storage capacity and preload is accordingly minimized.

There are two basic ways in which eccentric spools and flexible elements can be used to transmit and transform the bias from a spring to a valve in order to actuate that valve to a returned position and these can be combined in various ways. The first way, as shown in FIG. 7, is for a spring 1 to bias a flexible element 2 which then connects to at 6 and biases eccentric spool 3 over its periphery. Flexible element 2 unwraps from and thereby rotates eccentric spool 3 causing actuation of quarter turn valve 5 through shaft connection 4. This action gives rise to an increasing leverage with an increasing torque arm. The second way, as shown in FIG. 8, is for a spring 10 to rotatably bias a rotatably mounted, at 12, eccentric spool 11 which then biases flexible element 13 and thence motion converting concentric spool 14. Eccentric spool 11 rotates and wraps or takes up flexible element 13 thereon and flexible element 13 unwraps or lets out from and thereby rotates concentric spool 14 causing actuation of quarter turn valve 15. This second action gives rise to an increasing leverage from a decreasing torque arm and is advantageous because it permits wide variations in leverage and the generation of high leverage using a small amount of space. Also, the second action employs a shaft or other means for rotative mounting which is not subject to the actuation constraints of the valve stem, in particular the quarter turn constraint. This enables the eccentric spool to be used between any two torques arms that the eccentric spool and the flexible element can generate including its longest arm, $R+e$ and its shortest arm, $R-e$, where R is the radius of the circular eccentric and e is the eccentricity of its mounting. One way in which these two actions can be combined, as shown in FIG. 9, is for spring 20 to rotatably bias eccentric spool 21 which then biases flexible element 22 as in the second action, then flexible element 22 biases another eccentric spool 23 as in the first action. The torque created by this second eccentric is then used to actuate a quarter turn valve 24. The use of two eccentrics provides additional flexibility in producing a close loadmatch. More complicated combinations of these actions are possible.

A constant torque output can be produced from a spring by leverage which proportionately increases at the same rate as the decline in the spring output. An increasing output can be produced by leverage which proportionately increases faster than the decline in spring output. A more slowly decreasing output can be produced from a spring by leverage which proportionately increases at a slower rate than the decline in the spring output. Peaks, valleys, and initial and final dropoffs in the output curve can be obtained by allowing the torque arm defined by the eccentric spool and flexible element to pass through the minimum or maximum torque arms defined by $R-e$ or $R+e$ respectively. This could be useful for meeting high breakaway valve loads or loadmatching the spring retensioning load to some prior art controlled actuators. A fairly sharp final increase can be obtained by using the said combination of eccentric spools shown in FIG. 9. By setting said second action to produce an increasing bias in said flexible element and setting said first action to produce a valley by allowing the torque arm to pass through $R-e$, the increasing bias in the flexible element initially acts through a decreasing leverage to produce a substantially constant torque. After passing through $R-e$, the increasing bias in the flexible element acts through an increasing leverage which leads to sharp final increase in torque output. This could be useful for producing high final seating torques to produce a tight shutoff of some types of butterfly valves.

A four bar linkage, as shown in FIG. 10, can be used to transmit and transform the bias from a spring to a valve in order to actuate that valve to a returned position in a similar manner as the eccentric spools and flexible element. A spring 30 rotatably biases an arm link 31 of the four bar which is rotatably connected to the frame link 34. As the angle between this link and the connecting link 32 moves away from perpendicular, the leverage increases. The other arm link 33, which is also rotatably mounted to the frame link and would typically rotate an output shaft 35 and actuate quarter turn valve 36, would produce an increasing leverage with the connecting link 32 as the angle between them moves toward perpendicular. It is preferable to use both leveraging effects together.

Additionally in the invention, varying torque arm spools and flexible elements or four bar linkage are used to transmit and transform the output bias of a controlled actuator so as to be matched to the valve load and the spring retensioning load when these loads are not constant.

Also in the invention, nested torsion springs are used. Torsion springs are preferable because they directly produce rotary motion of the eccentric spool or four bar linkage without any additional motion converting mechanisms which would be necessary with a compression spring. Torsion springs also produce no swept volume and therefore can fit into a smaller space than an equivalent capacity compression spring. Nesting is preferable because it increases power density which leads to space savings and the redundancy increases reliability.

Additionally in the invention, a quarter turn output pneumatic cylinder actuator is used and is shown in FIG. 12. The actuator utilizes a double acting flexible element connection and concentric spool linear to rotary motion converter and produces a constant torque output, no side thrusting, permits manual override of the valve operator in which it is installed without fouling of the flexible element connection and can operate double actingly from one piston. The linear to rotary converter is formed by two flexible elements 50 and 51 which connect to and wrap on, in opposite directions, concentric spool 52 which has an output shaft 53. Flexible element 50 then connects to piston 54 while flexible element 51 then connects to push rod 55 which thence connects to piston 54. Both flexible elements act perpendicular to and produce net thrust through the center of the piston and produce substantially no side thrusting or torqueing of the piston which leads to longer seal life and improved reliability. When piston 54 is biased and moves to the right, flexible element 50 produces counterclockwise torque and rotation of concentric spool 52. When piston 54, and thereby push rod 55, is biased and moves to the left, flexible element 51 produces a clockwise torque and rotaton of concentric spool 52. In the event that the actuator is manually or otherwise overriden from the output shaft, the double acting nature of this flexible element connection will keep the flexible elements seated on the concentric spool which will prevent fouling of the flexible elements. If both said flexible elements are of equal strength, then this pneumatic cylinder actuator can be used in either double acting or single acting service. If this actuator is only to be used in single acting service, then one of said flexible elements can be derated.

Additionally in the invention, further size reductions and improved reliability is provided by having additional springs acting directly on a valve without being transformed. The output of the transformed springs is added to the output of the untransformed springs and produces a loadmached output. This is particularly useful in generating a constant torque quarter turn output where the untransformed springs are torsion springs which can be mounted around an output shaft thus using otherwise unused space. In this case the transformed output is set to be an increasing torque and balance off the decline in the untransformed output.

Cable is a preferred flexible element in this invention, for cost reasons, and an eccentric spool, as opposed to spirals and faired in sections which are shown in FIG. 11, is the preferred spooling element not only because it is a manufacturing expedient, but also because it produces the highest cable fatigue life within a given space requirement. Cable fatigue life, expressed as the number of stress cycles to failure, is a function of cable load, cable strength, cable diameter, fineness of stranding, and the radius of curvature over which flexing occurs. Although there is some tradeoff between cable load and flex radius, generally the minimum flex diameter must be held at or above a minimum of 18 to 25 times the cable diameter for a finely stranded cable. As one of the principle applications for the above actuators is in failsafe service, a very high or even infinite fatigue life is dictated and here a minimum flex diameter of 35 or more times the diameter of the cable is preferred for a finely stranded cable. A spiral or faired in section type spool produces a varying torque arm, at least partially, through changes in curvature, whereas an eccentric spool is circular, giving it a constant radius of curvature, and generates a varying torque arm through eccentric mounting. If a varying curvature spool were to be used in place of an eccentric spool and produce the same cable fatigue life, then the minimum radius of curvature of the varying curvature spool would have to be equal to the radius of the eccentric spool. Other radii of curvature on the varying curvature spool would be larger. Therefore, the equivalent fatigue life varying curvature spool would be larger than the eccentric spool and could not be packaged as efficiently. On the other hand, if the varying curvature spool were made to package into the same space as the eccentric spool, then the minimum radius of curvature would be smaller than the radius of the eccentric spool and therefore the cable would have a shortened fatigue life. The eccentric spool, therefore, represents an optimal solution to the concurrent problems of cable fatigue life and package density.

Also in the invention, a flexible element is used which consists of multiple cables. A multiple cable can carry the same load as a larger single cable. The larger diameter cable, however, needs to act over a larger minimum radius of curvature than a smaller cable in order to maintain an equivalent fatigue life. The use of a multiple smaller diameter cable instead of a single larger diameter cable will save space because the spool over which it acts can be made smaller without sacrificing fatigue life in the cable. Preferably, the multiple cable is a single cable which has been looped over turning pins so as to form a sufficient number of cable legs for distributing the imposed load. The cable legs reach a state of substantially equal tension when they are loaded by shifting over the turn pins, preferably with the aid of some lubricant or antifriction device. Optionally, once the cable legs are in a state of equal tension, then said cable legs can be clamped so that a failure of one cable leg will not result in failure of the entire multiple cable. The advantage of this design is that only one cable is needed instead of several cables with all their end fittings, variations in length, and separate means for producing equalized tension in the cable legs, such as adjusting screws and springs.

Other objects and advantages of the invention will in part be obvious and will in part appear hereinafter.

THE DRAWINGS

FIGS. 1 to 4 are graphs of the output characteristics of prior art spring return valve operators.

FIGS. 5 and 6 are graphs of the output characteristics of spring return valve operators according to the invention.

FIGS. 7 to 10 are schematic views of the basic spring return actuator mechanisms according to the invention FIG. 11 shows a schematic view of alternative spool shapes in this invention.

FIG. 12 is a schematic view of a pneumatic actuator according to the invention.

FIG. 15 is a sectional view taken along line A—A in FIG. 14 and shows the orientation of the spools at the retensioned position.

FIG. 16 is a sectional view taken along line A—A in FIG. 14 and shows the orientation of the spools at the returned position.

FIG. 17 is a side view taken along line C—C in FIG. 16.

FIG. 18 is a sectional view taken along line D—D in FIG. 16.

Figure 13:
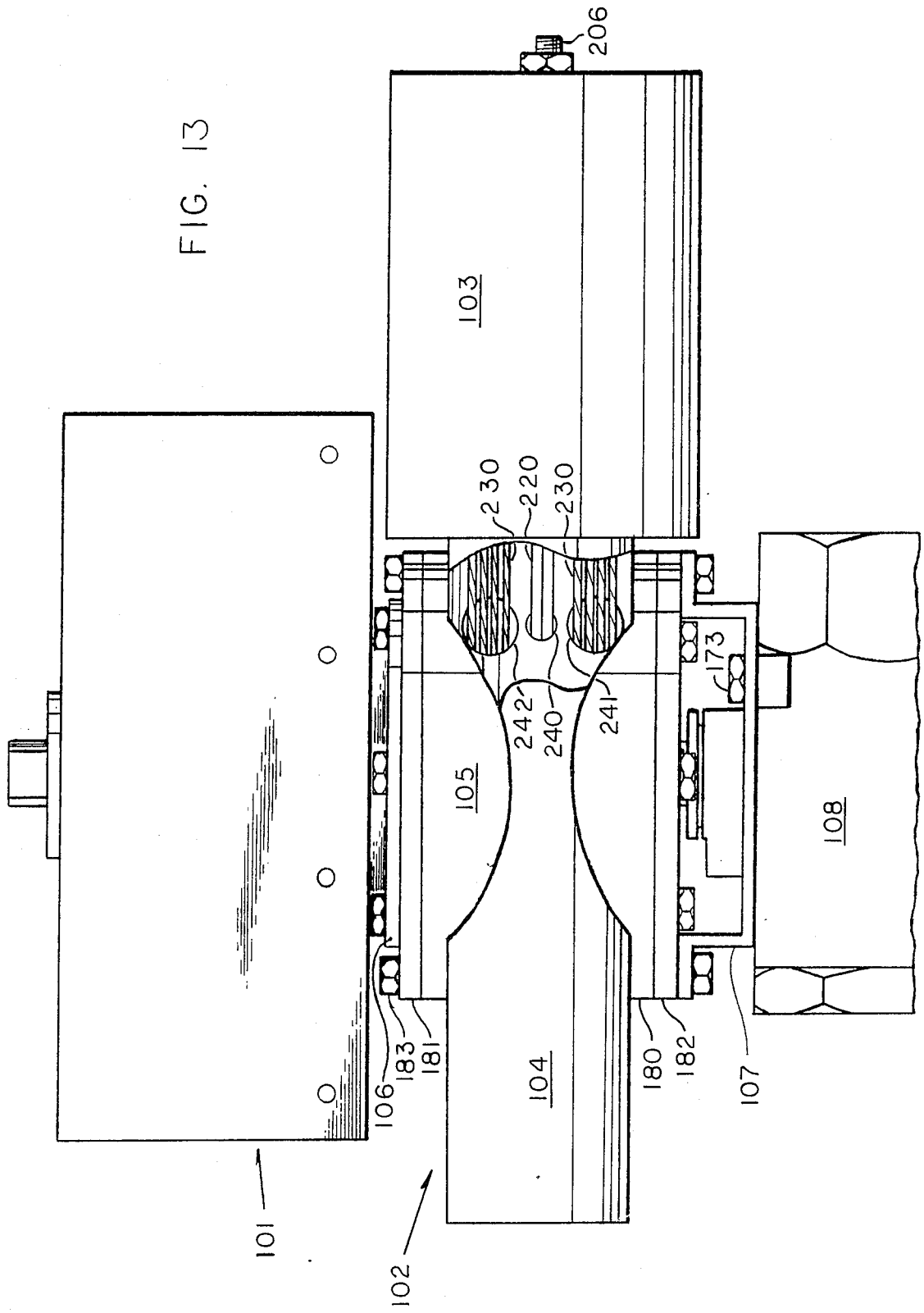
FIG. 13 is a side view of a first embodiment of the invention.
Figure 14:
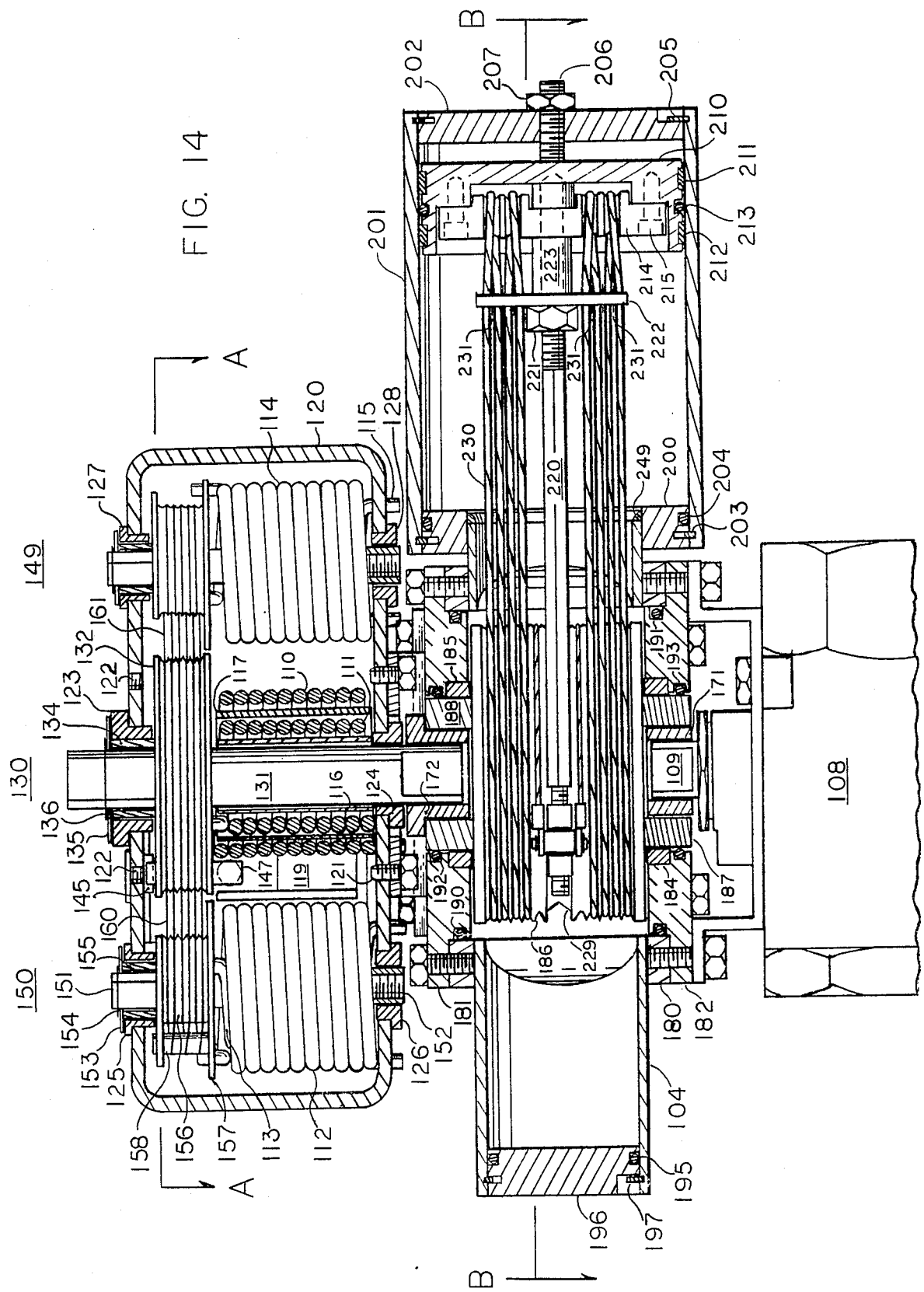
FIG. 14 is a sectional view of FIG. 13.

FIG. 19 is a sectional view taken along line B—B in FIG. 14. Solid lines show the retensioned position and dotted lines show the returned position. FIG. 20 is a side view taken along line E—E in FIG. 19.

FIG. 21 is a top sectional view of an alternative cable turn pin.

Figure 22:
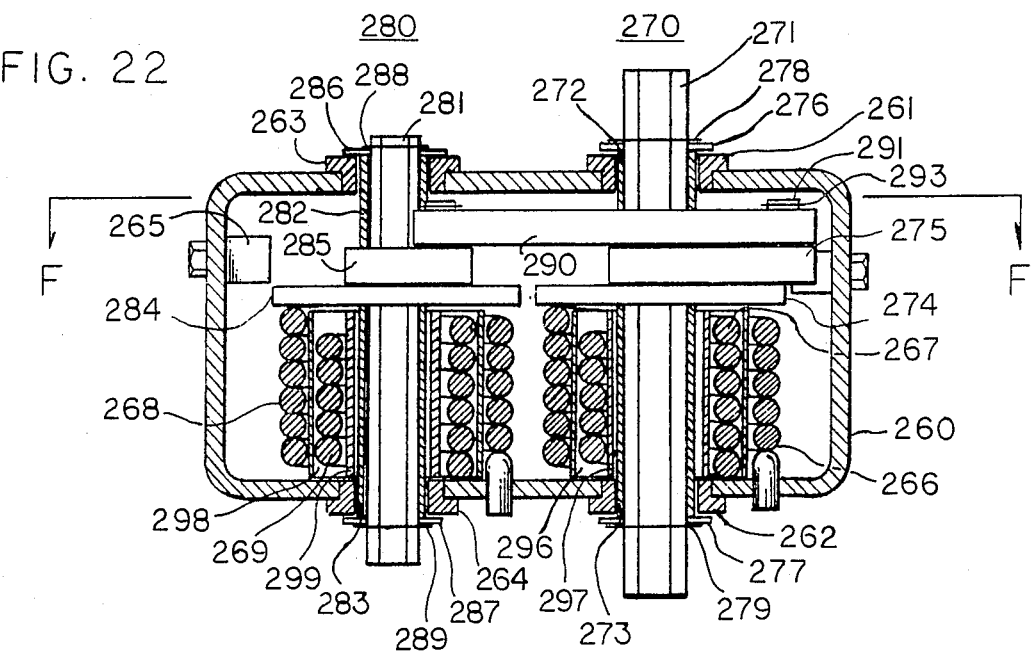

FIG. 22 is a side sectional view of a second embodiment of the invention.

Figure 23:
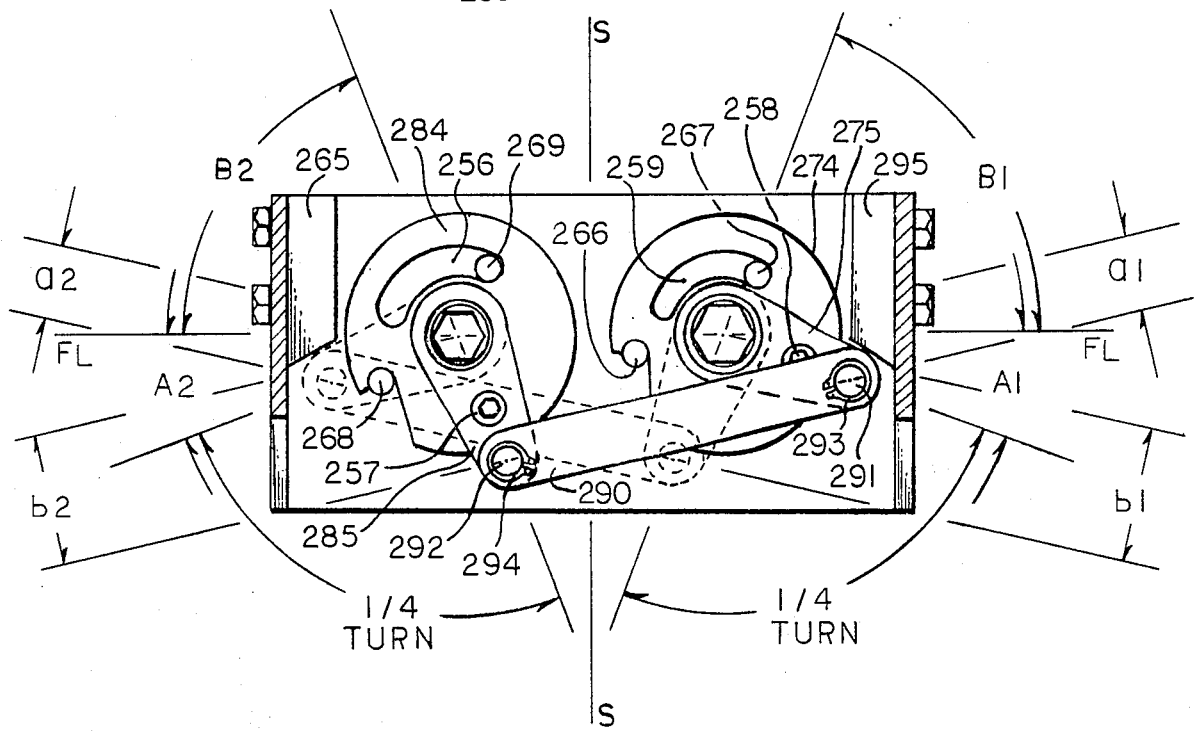

FIG. 23 is a sectional view taken along line F—F in FIG. 22. Solid lines show the retensioned position and dotted lines show the returned position.

Figure 24:
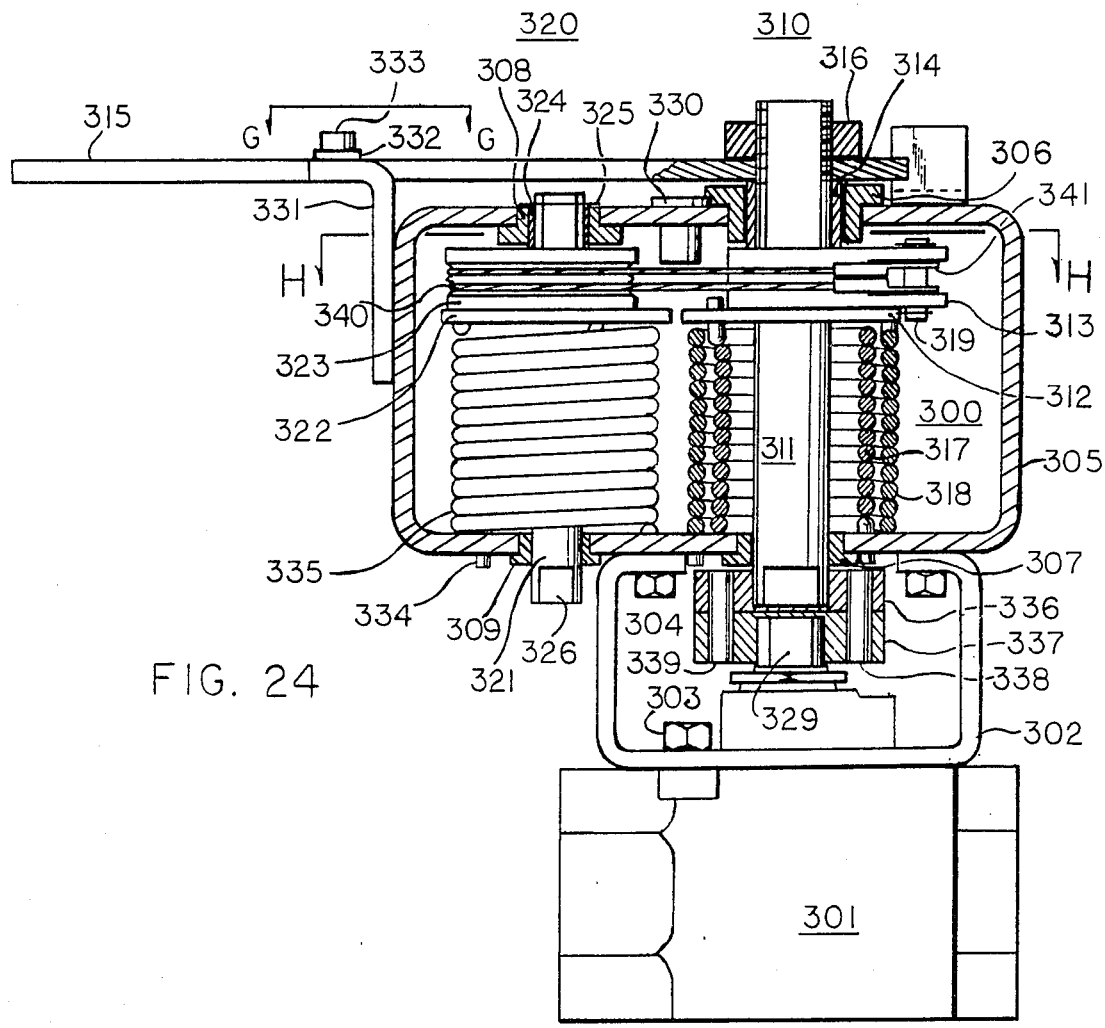

FIG. 24 is a side sectional view of a third embodiment of the invention.

Figure 25:
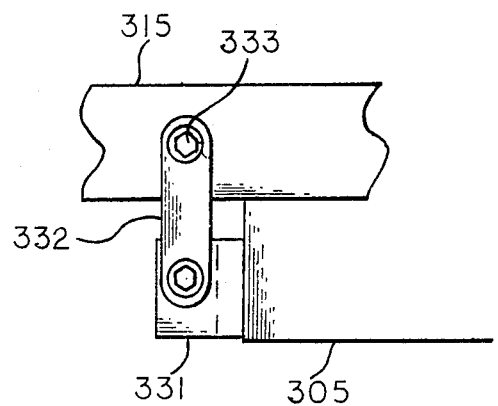

FIG. 25 is a sectional view taken along line G—G in FIG. 24.

FIG. 26 is a sectional view taken along line H—H in FIG. 24 and shows the component orientation at the retensioned position.

FIG. 27 is a sectional view taken along line H—H in FIG. 24 and shows the component orientation at the returned position.

Figure 28:
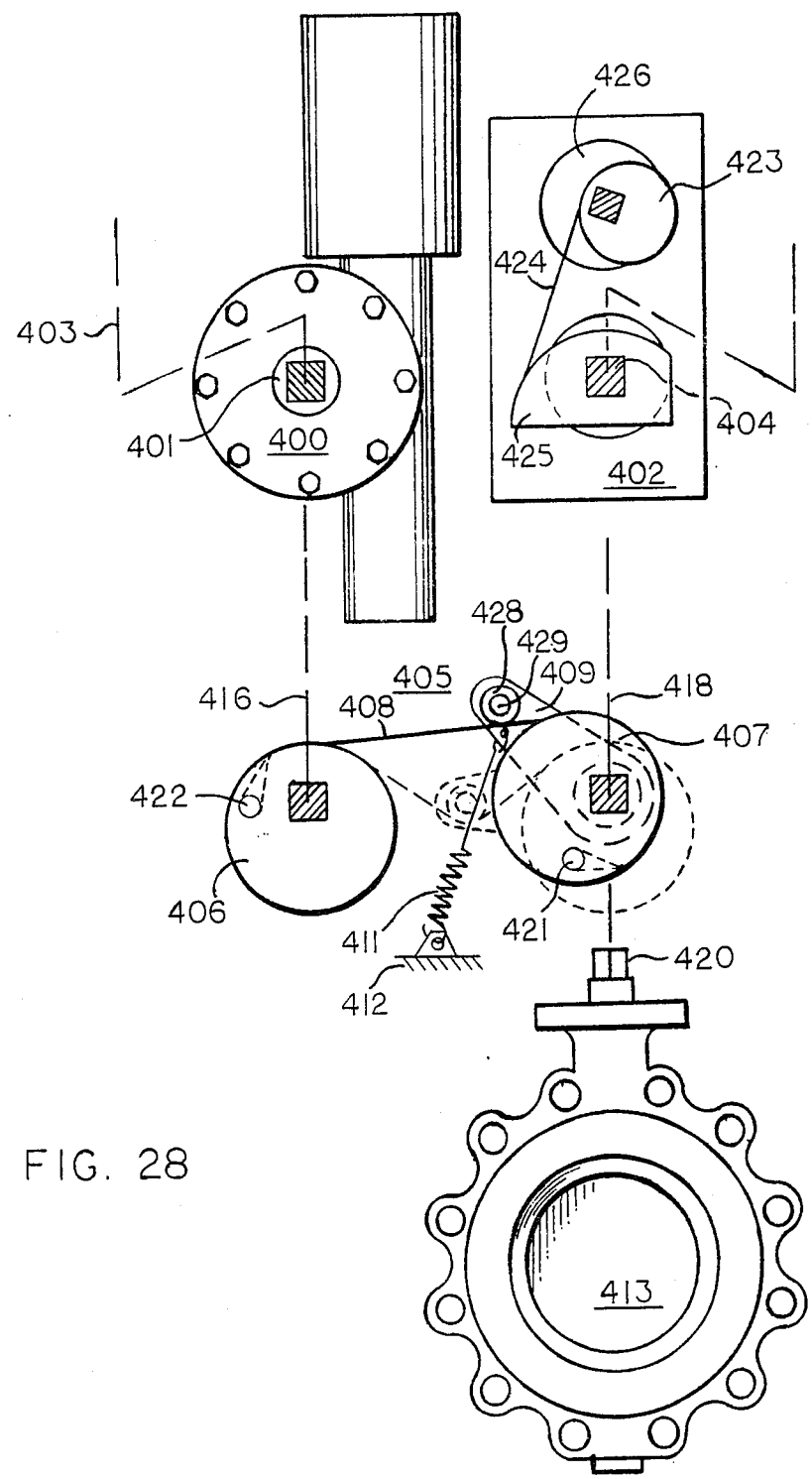

FIG. 28 is a schematic view of a fourth embodiment of the invention.

FIG. 29 is a schematic view of a fifth embodiment of the invention.

FIG. 30 is a top view of an alternative four bar linkage in the invention.

DESCRIPTION OF THE PREFERRED EMBODIMENTS

FIGS. 13 through 21 illustrate a first embodiment of a spring return valve operator according to the invention. This particular embodiment is directed towards a pneumatic spring return valve operators which produce a substantially constant torque output over a quarter turn. The valve operator is generally comprised of spring return actuator 101 and pneumatic actuator 102. Said pneumatic actuator is in turn comprised of pneumatic cylinder 103, push rod tube 104, and linear to rotary converter 105. Brackets 106 and 107, with the aid of bolts 173, 183 and 121, connect said spring return actuator, said pneumatic actuator and quarter turn ball valve 108 together.

Said spring return actuator is comprised of rigid frame 120, into which bearings or bushings 123 through 128 are conventionally mounted, an output shaft assembly generally indicated at 130 and two eccentric spool assemblies generally indicated at 149 and 150. Said bolts 121 engage threaded holes in the bottom of said frame. Said frame advantageously includes a duplicate set of threaded holes for the connection of said bracket 106, on the top of said frame indicated at 122.

Within said output shaft assembly, output shaft 131 has a pair of flats at both ends forming double dee shaft ends and is keyed or coupled at its upper end to first concentric spool 132 by a conventional double dee shaft end and hole feature. Said output shaft and said first concentric spool, with sleeve 134 providing a journal surface, are rotatably mounted in said bearings 123 and 124. Said sleeve, washer 135 and retaining ring 136 position said first concentric spool against the shoulder formed by the end of the upper double dee shaft end on said output shaft. Said first concentric spool, said washer and said retaining ring produce shoulders on either side of said bearing 123 and thereby axially position said output shaft and said first concentric spool in said frame. Said output shaft extends out the top and bottom of said frame so that it may couple to other devices.

Nested torsion springs 110 and 111 mount around output shaft and are connected between said frame and said first concentric spool by spring ends which engage holes in said frame and said first concentric spool such that said first concentric spool and said output shaft are biased in the clockwise direction as seen from FIG. 15. Said output shaft serves as a support mandrel for said torsion springs. Dividers 116 and 117 are plastic strips that are folded into tubes and which separate said torsion springs from each other and from said output shaft so as to prevent wear on said torsion springs and said output shaft.

Fixed stop pin 145 is rigidly mounted to said frame and is installed after said nested torsion springs 110 and 111 are preloaded. The preloading can be done in place by torqueing an exposed shaft end of said output shaft. Adjustable stop 146 is a set screw which mates with a threaded hole in frame brace 119. Spool pin 147 is rigidly mounted in said first concentric spool and protrudes from both the upper and lower surfaces of said first concentric spool. The contact of said spool pin with said adjustable stop determines the returned position of said spring return actuator or the limit of rotation of said output shaft assembly under the bias of said torsion springs. When said adjustable stop is slacked out, said spool pin contacts said fixed stop pin which determines the maximum returned position of said spring return actuator.

The details of construction of the two said eccentric spool assemblies are the same and only the component parts of said eccentric spool assembly 150 will be described in detail.

Within said eccentric spool assembly 150, shaft 151 has a threaded hole 152 at its lower end and is keyed or coupled at its upper end to eccentric spool 156 and spring plate 157 by a conventional double dee shaft end and hole feature. Said eccentric spool and said spring plate are additionally connected by screw 144. Said eccentric spool is a circular spool of radius R which has been mounted with eccentricity e. Said shaft and said eccentric spool, with sleeve 155 providing a journal surface, are rotatably mounted in said bearings 125 and 126. Said sleeve, washer 153 and retaining ring 154 position said eccentric spool and said spring plate against the shoulder formed by said double dee shaft end. Said eccentric spool, said washer and said retaining ring produce shoulders on either side of said bearing 125 and thereby axially position said eccentric spool assembly in said frame.

Nested torsion springs 112 and 113 mount around said shaft and are connected between said frame and the combination of said spring plate and said eccentric spool such that said eccentric spool is biased in the clockwise direction as seen from FIG. 15. Said shaft serves as a support mandrel for said torsion springs. Plastic dividers, not shown but which are the same as said dividers 116 and 117, separate said torsion springs and said shaft. Nested torsion springs 114 and 115 mount between said frame and said eccentric spool assembly 149 in substantially the same manner.

Said first concentric spool, which operates through substantially a quarter turn, has six parallel cable grooves on two oppositely located sectors of its periphery or circumference for engaging, taking up and letting out cable 160 and 161. Each said sector subtends an angle greater than 90 degrees. Pockets 138 and 139, located in opposite sectors of said first concentric spool over which said cables do not take up or let out, form clevis type features for holding cable turn pins 140 and 141 and terminal pins 142 and 143.

Said eccentric spool, which operates through substantially a half turn, has six parallel cable grooves over a majority of its periphery for engaging, taking up and letting out said cable 160. Pocket 159, located in the side of said eccentric spool over which said cable does not take up or let out, forms a clevis type feature with said spring plate for holding cable turn pin 158.

Said eccentric spool is approximately one half the diameter of said first concentric spool as the half turn take up of said eccentric spool equals the quarter turn let out of said first concentric spool and vice versa. In addition, said eccentric spool is preferably at least 35 times the diameter of said cable.

Said cable 160 has cable terminals 163 at each end. Said cable is preferably of a more flexible construction, 7×19 or finer, and is preferably jacketed. Said cable is looped so as to form six equal length cable legs. Said cable terminals connect to said terminal pin 143 and said cable loops twice over said turn pin 141 and loops three times over said turn pin 158. Said turn pins preferably have a lubricant applied thereto in order to reduce the amount of friction between said cable and said turn pins. Said cable legs wrap on said first concentric spool and on said eccentric spool in said six parallel cable grooves. Said grooves are faired into said pockets with a small radius over which said cable legs are directed to said turn pins and said terminal pin. Said cable legs do not, however, take up or let out and therefore repeatedly flex over said small fairing radius.

Said cable is installed after said nested torsion springs 112 and 113 are preloaded. Said threaded hole 152 in said shaft can receive a hex head bolt which in turn can receive a wrench which is used to rotate, preload and hold said torsion springs 112 and 113 while said cable is connected between said eccentric spool and said first concentric spool. Said bolt can then be removed so that said shaft is flush with said frame and said bearing for convenient packaging in an enclosure.

Said bias produced at said eccentric spool by said torsion springs 112 and 113 causes said cable to slide through said cable loops until all slack is removed from said cable and said cable legs are in a state of substantially equal tension.

While this embodiment shows six cable legs per eccentric spool, this should not be considered a preferred number of cable legs. The number of cable legs, N, is determined from the maximum force to be transmitted by the cable connection, F, the minimum breaking strength of the cable, S, and a static strength factor of safety preferably on the order of 10 or more.

$$N \geq 10F/S$$

The use of multiple cable legs allows the strength of a cable to be multiplied thereby permitting a smaller cable to transmit the same load as a larger cable over a spool of given radius but with improved fatigue life.

The details of the connection of cable 161 between said first concentric spool and eccentric spool 148 are substantially the same as the connection of said cable 160 between said first concentric spool and said eccentric spool 156.

Referring to FIGS. 13, 14 and 19 to 21, said linear to rotary converter of said pneumatic actuator is comprised of a rigid housing formed by tube member 180 and end plates 181 and 182. Said end plates are fastened to said tube member by said screws 183 which are arranged in conventional eight point equally spaced bolt circles. Said bolt circles are not shown in their entirety, but can be seen in FIG. 29 at 455. Said bolt circles additionally provide advantageous means for the connection of said brackets to said rigid housing. O-rings 190 and 191 form a seal between said end plates and said tube member. Said push rod tube is rigidly connected and sealed to said tube member by a continuous weld 248 at the intersection of said push rod tube and said tube member. Circular end cap 196 is held in and seals the end of said push rod tube by retaining ring 197 and o-ring 195. Said push rod tube is rigidly connected to and sealed to front cylinder head 200 by weld 249. Cylinder wall 201 is held by and seals against said front cylinder head by retaining ring 203 and o-ring 204. Rear cylinder head 202 is held to said cylinder wall by retaining ring 205. There is no seal needed on said rear cylinder head as said pneumatic cylinder is used single actingly in this embodiment and said rear cylinder head is on the vented side of piston 210. Adjustable stop 206 is a set screw which mates with a threaded hole in the center of said rear cylinder head and defines the retensioned position of said spring return valve operator. Jam nut 207 locks said adjustable stop.

Bearings 184 and 185 are mounted in the center of said end plates. Second concentric spool 186, with rigidly connected shaft extensions 187 and 188, is rotatably mounted in said bearings. O-rings 192 and 193 form a seal between said end plates and said shaft extensions. Adapter couplings 171 and 172 have a square shaft exterior and are keyed or coupled to said second concentric spool by conventional square shaft and hole features. Said adapter couplings 171 and 172 additionally are coupled to valve stem 109 and said spring return actuator output shaft, respectively, by conventional double dee shaft shaft and hole features.

Due to the inherent symmetries, said square shaft and hole feature between said coupling and said shaft extensions of said second concentric spool, and said eight point bolt circles between said between said brackets and rigid housing, advantageously permit the relative 90 degree indexing of said pneumatic actuator with respect to the following components either individually or in various combinations; said valve stem, the body of said ball valve, and said spring return actuator. The relative indexing is accomplished through disassembly, indexing and reassembly of the appropriate components.

Said second concentric spool, which operates through substantially a quarter turn, has ten parallel cable grooves on its periphery for engaging, taking up and letting out cables 230 and 232. Pocket 189, located in the side of said second concentric spool over which said cables do not take up or let out, forms a clevis type feature for holding cable terminal and turn pin 234.

Said piston is slidably mounted inside said cylinder wall. Said piston is grooved on its circumference to receive plastic slide bearings 211 and 212 and o-ring 213. Said slide bearings are preferably made from PTFE or an equivalent. Said o-ring forms a seal between said piston and said cylinder wall. Push rod 220 is of hexagonal cross section and is threaded at both ends. Nut 221 screws onto, and cable guide 222, compression sleeve 223 and cable turn pin 214 have holes permitting them to slide over the right end of said push rod, as seen in FIGS. 14 and 19. Said push rod screws into a threaded hole in the center of said piston and said nut compresses said cable guide, said compression sleeve and said cable turn pin against said piston. Screws 215 additionally secure said cable turn pin to said piston. Clearance space is provided between said turn pin and said piston for said cable to be able to shift freely over said turn pin.

Details of the foregoing construction are such that the axis of said cylinder wall, which coincides with the axis of said push rod, is substantially tangent to said second concentric spool and parallel to said cable grooves. Said push rod passes said second concentric spool through clearance groove 229 which is parallel to said cable grooves. Passages 240 and 243 allow said push rod to pass through said tube member. Said passage 240 is of hexagonal cross section and forms a sliding coupling with said push rod thereby allowing reciprocation but preventing rotation of said push rod, said piston, said cable guide and said cable turn pin.

Said cable 230 has loop type cable terminals at each end, is preferably of a more flexible construction, 7×19 or finer, is preferably jacketed, and is looped so as to form eight equal length cable legs. Said cable terminals connect to and said cable loops three times on said turn pin 234. Said cable loops four times on said turn pin 214. Said turn pins preferably have a lubricant applied thereto in order to reduce the amount of friction between said cable and said turn pins. Said cable legs wrap on the periphery of said second concentric spool in the outer 8 of 10 said cable grooves and connect said piston with the periphery of said second concentric spool. Said cable guide and spacers 231 align said cable legs so as to be parallel to said axis of said cylinder wall and in substantially the same tangent plane to said second concentric spool in order to prevent side thrusting of said piston. Said eight cable legs connect to said piston in two groups of four cable legs each which are located symmetrically on either side of said of the center of said piston in order to prevent torqueing between said piston and said cylinder wall. Passages 241 and 242 allow said cable legs to pass through said tube member.

The use of eight cable legs between said second concentric spool and said piston should not be considered a preferred number. The number of cable legs is determined from the maximum force to be transmitted, the minimum cable strength and preferably a conservative factor of safety.

Said cable 232 has terminals 233 at each end. Said terminals connect to the left end of said push rod through cable tension fitting 224, as seen from FIG. 19. Said cable loops on said turn pin 234 to form two cable legs which wrap on said concentric spool in the direction opposite to said cable 230. Said cable legs of cable 232 engage the inner two said cable grooves and locate symmetrically on either side of said push rod.

Said cable tension fitting has a hole through its center which allows it to slide over the left threaded end of said push rod. Nut 226 screw onto the left threaded end of said push rod and is used to move said cable tension fitting to the left, as seen from FIG. 19, thereby mildly tensioning said cable 232 and 230 and compressing said push rod. This tensioning of said cables causes said cables to slide over said turn pins until all slack is removed from said cables which will keep said cable legs firmly seated in their respective grooves at all times and permit said cables to operate in a state of substantially equal tension.

FIG. 21 shows an equivalent construction for turning said cable 230 at said piston and is comprised of two turn pins 218 and 219 which are fastened to said piston with cable clearance space between said turn pins and said piston. Said cable legs are parallel to the axis of said cylinder wall and in the same tangent plane to said second concentric spool. Each additional said cable leg is formed by a pair of 270 degree loops, one each on said turn pins. Said cable can shift through said loops, as before, to produce substantially equal tensioning in said cable legs.

Port 244 is used to connect to a controlled source of compressed air, control typically accomplished with a solenoid valve which is not shown. Port 208 is used as a vent.

The operation of said pneumatic spring return valve operator is as follows. The returned position and the retensioned position of said spring return actuator are set to coincide with the closed position and open position respectively of said ball valve thereby producing fail closed operation. This is done by aligning the positions of said valve stem, which in the case of said ball valve is not confined to a particular quadrant, with the appropriate positions of said spring return actuator using the 90 degree indexing capability of said coupling 171 with respect to said pneumatic actuator. As will subsequently be seen, only minor changes in mounting orientation are needed to change the operation of said ball valve over to fail open operation. FIG. 14 shows the state of said valve operator and valve while compressed air pressure is applied to said pneumatic actuator putting said valve operator at the returned position. The compressed air forces said piston to the right to the end of its power stroke thereby causing said spring return actuator to be fully retensioned and causing said ball valve to be in the open position which is conventionally indicated by the flats of the double dee shaped valve stem being parallel to the flow path through said ball valve. Upon release of the compressed air pressure from said pneumatic actuator, said spring return actuator produces an approximately constant torque, quarter turn clockwise rotation, as seen from FIG. 15, which acts through said pneumatic actuator and said coupling 171 to actuate said ball valve, which presents a substantially constant load or is approximately taken as presenting a constant load, to the returned position. Said spring return actuator also returns said pneumatic actuator, moving said piston to the left as seen from FIG. 14. When pressure is introduced through said port 244, said pneumatic actuator produces a constant torque quarter turn couterclockwise rotation, as seen from FIG. 19, which acts through said couplings 171 and 172 to actuate said ball valve and said spring return actuator to the retensioned position which retensions said spring return actuator. The spring return actuator retensioning load presented to said pneumatic actuator is approximately constant. The output of said pneumatic actuator is equal to the valve load plus the spring return actuator retensioning load or approximately twice the valve load. The relationship of the outputs and loads are illustrated in FIG. 5. Said stops determine the limits of quarter turn rotation in either direction and provide a small amount of adjustment to those limits. The extension of said output shaft 131 out the top of said spring return actuator is a convenient location for the attachment of various sensors such as visual position indicators, limit switches or a valve positioner or for the attachment of other actuators such as a manual override.

Within said spring return actuator, said nested torsion springs 110 and 111 bias said output shaft and produce a first torque over a quarter turn which is declining. Said nested torsion springs 112, 113 and 114, 115 bias said eccentric spool assemblies 150 and 149 and produce a declining output over a half turn. Said eccentric spools, said first concentric spool, and said interconnecting cables function as a device for transforming the bias produced by said torsion springs 112, 113, 114, and 115 and transmitting said transformed bias to said output shaft. At said output shaft said transformed bias is combined with the untransformed bias of said torsion springs 110 and 111 to produce a loadmatching substantially constant torque. In more detail, said eccentric spool assemblies start actuation from the retensioned position by taking up said cable legs over a relatively long torque arms. As said eccentric spools rotate, said torques arm decrease, proportionately speaking, faster than the declining output of said torsion springs 112, 113, 114, 115 thereby creating an increasing force in said cable legs which acts on the constant torque arm presented by said first concentric spool thereby creating a second torque at said output shaft which is increasing. The increase in the second torque is set to balance off the decline in the first torque as that the sum of the first and second torques yields an approximately constant torque which is used to actuate said ball valve and presents a constant retensioning laod to said pneumatic actuator. In addition, the forces applied by said cable legs are equal and in opposite directions on opposite sides of said first concentric spool thereby generating torque at said output shaft with substantially no bearing reactions, which reduces bearing and shaft wear and shaft stresses.

Said eccentric spool assemblies are allowed to rotate a half turn during actuation in order to take advantage of the maximum change in torque arm, from $R_e+e$ to $R_e-e$, that can be provided by an eccentric and flexible element, as shown in FIG. 15 and 16. A torque arm is the perpendicular distance or offset from a cable or other force transmitter to an axis of rotation. The diameter of said first concentric spool is approximately twice the diameter of said eccentric spools due to the fact that said cable let out by said first concentric spool over a quarter turn must equal the cable taken up by said eccentric spools over a half turn. This relative difference in the radii between said eccentric spools and said first concentric spool provides an additional overall level of leverage therebetween and has the effect of increasing the amount of torque which said nested torsion springs 112, 113, 114, and 115 generate at said output shaft.

The output of said torsion springs is generally described by the rotary form of Hook's Law;

$M = k\theta$  
$M$ - torque  
$k$ - spring rate  
$\theta$ - rotation

The energy released by said torsion springs in accordance with Hooke's Law is $\Delta E = (\frac{1}{2})[k(\theta_1^2 - \theta_2^2)]$  
$E$ - energy  
$\theta_1$ - starting rotation, radians  
$\theta_2$ - final rotation, radians Said torsion springs preferably have the same wire diameter and are made from the same spring wire material and therefore have substantially the same maximum torque ratings. As the inner and outer springs of said nested torsion springs have necessarily differing diameters and preferably have the same height and same maximum torque ratings, said inner torsion springs will have a higher spring rate than said outer torsion springs. Inner said torsion springs 111, 113, and 115 have a spring rate such that they reach full torque with 270 degrees of tensioning. Outer said torsion springs 110, 112, and 114 have a spring rate such that they reach full torque with 360 degrees of tensioning. Said outer and inner torsion springs are differentially preloaded to the returned position by giving said outer torsion springs 90 degrees more preload than said inner torsion springs. Said outer torsion springs 112 and 114 are preloaded by 180 degrees and said inner torsion springs 113 and 115 are preloaded by 90 degrees. Said outer torsion spring 110 is preloaded by 270 degrees and said inner torsion spring 111 is preloaded by 180 degrees. Said differential preload enables said inner and outer torsion springs to all reach their full torque ratings at the retensioned position. After actuation of said spring return actuator from said retensioned position to said returned position, I calculate that said inner torsion springs 113 and 115 and said outer torsion springs 112 and 114 have declined to about 33% and 50% of their full torque outputs respectively and have released 89% and 75% of their energy respectively.

The significance of the energy extraction is that for a given set of said springs which have some maximum energy storage capacity, the higher the percentage energy extraction, the higher the constant torque output which can be generated at said output shaft over a quarter turn, or conversely, for a given constant torque output over a quarter turn, the higher the percentage energy extraction then the smaller said springs need to be. I figure that the constant torque, $<M>$, that can be produced at said output shaft over a quarter turn, the total energy storage capacity of said torsion springs, Ec, and the fraction of that energy which is released, f, are approximately related by:

$<M> = fEc/(\pi/2)$

It is possible to obtain a higher percentage energy extraction from said torsion springs 112, 113, 114, and 115 with said half turn eccentric spool assemblies by selecting said springs such that they reach full torque with fewer degrees of tensioning. The percentage improvement is small, however, and is largely offset by the larger spring wire which said springs would have to use in order to maintain the same total energy storage capacity.

As said torsion springs 110 and 111 work over a quarter turn, their drop in output and percentage energy release is less than the other said torsion springs, I figure about 44% and 56% respectively. While used less efficiently, they are included because the space around the output shaft will be available in a relatively simple frame and enclosure package and their use, therefore will raise the overall power density of the spring return actuator and improve the reliability of the spring return actuator as a whole through redundancy.

For said half turn eccentric spools to transform the output said torsion springs 112, 113, 114, and 115 such that the total output of said spring return actuator is an approximately constant torque, I calculate that the long torque arm $R_e+e$ and the short torque arm $R_e-e$ of said eccentric spools are about 73% and 27% respectively of the diameter of said eccentric spools.

To determine the long and short torque arms and the eccentricity needed to generate a substantially constant torque or some other output, an increasing torque for example, from a given set of torsion springs or other springs, the following simultaneous equations, which I derived, can be solved for e, the eccentricity, with due consideration given to the aforementioned relations, laws, and design parameters.

$$M_{SRA1} = M_{o1} + \sum_{i=1}^{n} M_{e1} [R_c/(R_e + e)]$$

$$M_{SRA2} = M_{o2} + \sum_{i=1}^{n} M_{e2} [R_c/(R_e - e)]$$

$$M_{SRA2} = k M_{SRA1}$$

$$k = 1 \text{ (for constant torque)}$$

Subscripts 1 and 2 refer to the retensioned and returned positions respectively $R_c$ and $R_e$—radii of said concentric and eccentric spools, respectively $M_o$ and $M_e$—torques directly produced by torsion springs at said output shaft and eccentric spool, respectively n—number of eccentric spool assemblies biased by torsion springs $M_{SRA}$—torque output of said spring return actuator k—ratio of final or returned position torque output to starting or retensioned position torque output =1 is a constant torque >1 is an increasing return actuation torque and a decreasing retensioning load torque $0<k<1$ is a decreasing return actuatiion torque and an increasing retensioning load torque The torque output of said spring return actuator is not exactly constant but has a slight wave form as shown in FIG. 5. This wave form is due to the fact that said torsion spring output decreases linearly while the torque arm generated by said eccentric spools and said cable legs decreases trigonometrically. I figure that the relationship between the torque arm, r, and the rotation of said eccentric spools over a half turn, $\theta$, from $R_e+e$ to $R_e-e$ is given by:

$$r = R_e + e \cos\theta \quad \theta: 0-180 \text{ degrees}$$

This torque arm equation is approximate because the orientation of said cables change through the half turn rotation of said eccentric spools and this has the effect of making the range of torque arms through which said eccentric spools operate over a half turn slightly less than $R_e+e$ to $R_e-e$. In this embodiment, the torque arm operates from slightly less than $R_e+e$ to $R_e-e$. I calculate roughly that the initial dip and subsequent rise in torque output in this embodiment is on the order of 4% and 8% respectively. In my opinion, these fluctuations are negligible. However, if a particular application of said spring return valve operator called for a more uniform constant torque, some modifications are possible. First and preferably, said eccentric spools could be used over less than a half turn, 165 or 150 degrees for instance, thereby not using the most extreme torque arms $R_e+e$ and $R_e-e$. This would make the torque arm change in a more linear fashion which would reduce the size of the fluctuations. Second, spiral shaped spools could be used in place of said eccentric spools. the torque arm generated thereby would behave in a linear fashion.

Within said pneumatic actuator, compressed air of pressure P, enters said port 244 and pressurizes said rigid housing, said push rod tube, and said piston of area A, causing said piston to move toward said rear cylinder head until said stop 206 is contacted. The rear side of said piston is vented by said port 208. The force produced at said piston is transmitted through said cable legs of said cable 230 to said second concentric spool, of constant radius $R_p$ thereby producing a constant torque as said second concentric spool rotates. The magnitude of the pneumatically generated torque is;

$$M = R_p P A$$

The stroke of said piston is substantially equal to a quarter of said second concentric spool circumference plus some extra for adjustment purposes. As said cable legs are symmetrically arranged around the center of said piston, are perpendicular to the face of said piston and are parallel to the axis of said cylinder wall, substantially no side thrusting or torqueing of said piston results. Said hexagonal push rod and said mating passage prevents the rotation of said piston and keeps said cable legs substantially parallel to each other and on the same tangent with respect to said second concentric spool. Said plastic slide bearings, provide protection against any minor side thrusting of said piston and in combination with said push rod provide stabilization of any minor torqueing of said piston. When port 244 is exhausted either by controls or by equipment failure, said spring return actuator, in addition to returning said ball valve, causes said second concentric spool to take up said cable legs of said cable 230, let out said cable legs of said cable 232, and thereby move said piston and said push rod toward said front cylinder head. In the event of manual override of said valve operator, as said second spool is caused to rotate couterclockwise, as seen from FIG. 19, said cable legs of said cable 232 are taken up by said concentric spool and thereby pull on the right end of said push rod. Said push rod pushes said piston toward said rear cylinder head and thereby causes cable legs of said cable 230 to remain firmly seated in their respective cable grooves while letting out from said second concentric spool thus preventing fouling of said cable legs of said cable 230. Said push rod and said cable 232 also prevent fouling of said cable 230 when said pneumatic actuator is disassembled from said spring return actuator and ordinary handling of said pneumatic actuator could cause said second concentric spool to rotate.

Other features of this embodiment include construction of said spring return actuator and said pneumatic actuator advantageously as separate modules as opposed to an integrated construction. Modules are preferred because the output of said pneumatic actuator is a function of not only its construction but also the minimum supply pressure. As there are a wide variety of minimum supply pressures in use and a wide variety of valve loads, attempting to construct said pneumatic spring return valve operator in an integrated form in which said spring return actuator is load matched to said ball valve and said pneumatic actuator and said minimum supply pressure is load matched to said ball valve and said spring return actuator would lead to a large number of distinct models. With a modular construction, however, the equivalent large number of models can be constructed from relatively few modules because a particular version or size of said pneumatic actuator can be used on several sizes of said spring return actuator and said ball valve depending on the supply pressure. Only a particular set of said couplings and said brackets are needed to make a given combination of said modules and said valves.

In addition, said square hole and shaft coupling feature of said couplings 171 and 172 and said second concentric spool enables 90 degree indexing of said couplings with respect to said second concentric spool. Said eight point bolt circles enable 90 degree indexing of said brackets with respect to said rigid housing. This embodiment shows said spring return actuator connected to said ball valve to provide fail closed service wherein the returned position of said spring return actuator coincides with the closed position of said ball valve. Said valve operator can be configured for fail open service by removing said valve operator from said ball valve and said lower coupling 171, rotating said lower coupling and said valve stem a quarter turn, and reinstalling said valve operator on said lower coupling and said ball valve. Alternatively, this embodiment can be configured for fail open service by removing both said brackets and both said couplings, inverting both said pneumatic actuator and said spring return actuator such that their respective actuation directions are reversed, and reinstalling said brackets and said couplings with the returned position of said spring return actuator aligned with the open position of said valve. Note that said threaded holes of 122 of said spring return actuator would now connect with bolts 121 and said bracket 106. This alternative is useful where a quarter turn valve such as a butterfly valve can only operate in one quadrant. Additionally, the 90 degree indexing feature allows the relative orientation of said pneumatic actuator, said spring return actuator and said ball valve to be changed by increments of 90 degrees with respect to each other without changing the function of said valve operator with respect to said ball valve. For example, said pneumatic actuator can be removed from said lower bracket 107 and said lower coupling 171, indexed a quarter turn and reconnected to said lower coupling and said lower bracket. This capability is useful for installation of said valve operator in restricted spaces. It will be noted that while the preferred coupling feature is a square shaft and hole other equivalent coupling features such as splines can be used which would also provide a 90 degree indexing capability.

Said pneumatic actuator is preferably mounted between said spring return actuator and said ball valve so that during actuation of said pneumatic actuator, said output shaft 131 is loaded only by the spring retensioning load, not by the spring retensioning load plus the valve load which would necessitate a stronger construction of said output shaft.

It will also be noted that the upper and lower female shaft ends of said second concentric spool allow the male shaft ends of said output shaft and said valve stem to nest inside said pneumatic actuator thereby reducing the vertical height of said valve operator.

It will additionally be noted that while said pneumatic actuator is used as a single acting actuator in this embodiment, said pneumatic actuator is inherently capable of double acting service, with or without a spring return actuator. If said rear cylinder head is sealed and the controls for supplying compressed air to said pneumatic actuator are set up such that pressure can also be supplied to said port 208 while venting said port 244, then said pneumatic actuator will function as a double acting pneumatic actuator. If the number and strength of cable legs in said cable 232 are increased along with the number of cable grooves in said second concentric spool and the size and strength of said push rod and said cable tension fitting are increased along with other accomodating modifications, then said pneumatic actuator will be able to durably generate full output torque in both rotational directions. It will be seen that the general arrangement and interconnection of said cable or other flexible element connections and said push rod enables the construction of an overridable single acting or a double acting constant torque actuator from a single concentric spool and a single conventionally sealed reciprocating fluid power actuator which will not experience any side thrusting.

SECOND EMBODIMENT

FIGS. 22 and 23 illustrate a second embodiment of a spring return actuator for use with a controlled actuator in a quarter turn spring return valve operator, according to the invention.

Said spring return actuator is generally comprised of a rigid frame 260 into which bearings 261, 262, 263, and 264 are mounted, an output shaft assembly generally indicated at 270 and a second shaft assembly generally indicated at 280.

Within said output shaft assembly, hexagonal output shaft 271 is keyed or coupled to first arm 275 and first spring plate 274 by a conventional hexagon shaft and hole feature. Said first arm and said first spring plate are additionally connected by screw 258. Said output shaft with sleeves 272 and 273 providing a journal surface, are rotatably mounted in said bearings 261 and 262. Said sleeves, washers 276 and 277, and retaining rings 278 and 279 axially position said first arm and said first spring plate on said output shaft and axially position and retain said output shaft assembly in said frame. Said output shaft extends out the top and bottom of said frame so that it can couple to a quarter turn valve, a controlled actuator and perhaps other devices.

Nested torsion springs 266 and 267 mount around said output shaft and are connected between said frame and said spring plate by spring ends which engage mating features in said frame and said first spring plate such that said output shaft is biased in the clockwise direction as seen from FIG. 23. Upper said spring end of said inner torsion spring 267 engages curved concentric slot 259 in said first spring plate. Said output shaft serves as a support mandrel for said springs. Plastic tubes 296 and 297 nest and prevent wear between said springs and said sleeve 273.

Within said second shaft assembly, hexagonal second shaft 281 is keyed or coupled to second arm 285 and second spring plate 284 by a conventional hexagon shaft and hole feature. Said second arm and said second spring plate are additionally connected by screw 257. Said second shaft, with sleeves 282 and 283 providing journal surfaces, is rotatably mounted in said bearings 263 and 264. Said sleeves, washers 286 and 287, and said retaining rings 288 and 289 axially position said second arm and said second spring plate on said second shaft and axially position and retain said second shaft assembly in said frame.

Nested torsion springs 268 and 269 mount around said second shaft and are connected between said frame and said second spring plate such that said second shaft and said second arm are biased in the clockwise direction as seen from FIG. 23. Upper said spring end of inner said torsion spring 269 engages curved concentric slot 256 in said second spring plate. Said second shaft serves as a support mandrel for said springs 268 and 269. Plastic tubes 298 and 299 nest and prevent wear between said springs and said sleeve 283.

Pins 291 and 292 are rigidly connected to the outer ends of said first and second arms, respectively. Connecting link 290 is rotatably connected between said pins. The combination of said connecting link, said arms, and said frame forms a four bar linkage. Retaining rings 293 and 294 retain said connecting link on said pins and said arms.

Stop 265 is rigidly connected to said frame and is installed after said nested torsion springs 268 and 269 are preloaded. Preloading of said springs can be done in place by torqueing an exposed shaft end. The contact of said second arm with said stop limits the clockwise motion of said second arm and defines the returned position of said spring return actuator. A second stop 295 can be rigidly connected to said frame, after preloading of said springs. Said second stop makes contact with said first arm, limits its counterclockwise motion as seen from FIG. 23 and defines the fully retensioned position of said spring return actuator.

It will be noted that if said spring return actuator is used on a quarter turn valve such as a butterfly valve in which the valve element rotatably presses against the valve seat at the closed position to produce a tight seal then when the returned position is to be the closed position of the valve, the returned position will be defined by the closed position of the valve rather than said stop. Said stop would only serve to hold an uninstalled returned position in said spring return actuator. Said stop could include a conventional set screw adjustment feature, not shown, to facilitate the transition during installation from the uninstalled returned position defined by said stop to the installed returned position defined by the closed position of the valve.

When said spring return actuator is interconnected with a controlled actuator and installed on a quarter turn valve, said spring return actuator actuates said valve to the returned position while said controlled actuator actuates said valve and said spring return actuator away from the returned position to the retensioned position. This embodiment describes a spring return actuator which produces a substantially constant torque at said output shaft over a quarter turn and extracts a large fraction of the total spring energy storage capacity. Said spring return actuator interconnects with said controlled actuator and said valve in the manner described in the first embodiment wherein said output shaft of said spring return actuator couples to the output shaft of said controlled actuator which in turn couples to said valve stem and wherein said constant torque spring return actuator output is used to meet a substantially constant valve load in the actuation to the returned position and said controlled actuator preferably produces a constant torque output and is used to meet said substantially constant valve load plus the substantially constant spring return actuator retensioning load in the actuation to the retensioned position. It will be noted that if said spring return actuator were to be configured to produce various other torque curves such as an increasing torque as the returned position is approached, then said spring return actuator would preferably be interconnected with a controlled actuator in the manner of the fourth embodiment.

The operation of said spring return actuator is as follows. In FIG. 23, the retensioned and returned positions of said four bar are shown in solid and dotted lines respectively. Said nested torsion springs 266 and 267 bias said output shaft and produce a first torque over a quarter turn which is declining. Said nested torsion spring 268 and 269 bias said second arm and produce a declining output over a quarter turn.

The use of a quarter turn rotation at said second shaft is preferred but not essential as somewhat greater or lesser rotations could be used. An upper limit on the amount of rotation at said second shaft is determined by the deadpoint of said second arm and said connecting link.

Said four bar linkage functions as a device for transforming the bias produced by said torsion springs 268 and 269 and transmitting said transformed bias to said output shaft. At said output shaft, said transformed bias is combined with the untransformed bias of said torsion springs 266 and 267 to produce a loadmatching substantially constant torque. In more detail, said second arm starts actuation from the retensioned position by biasing said connecting link through a relatively large second torque arm, indicated by dimension 'b2', due to the nearly perpendicular orientation of said second arm with respect to said connecting link. A torque arm is the perpendicular distance or offset from said connecting link or other force transmitter to an axis of rotation. Said first arm starts actuation from the retensioned position by being biased by said connecting through a relatively small first torque arm, indicated by dimension 'a1', due to the acute angle between said connecting link and said first arm. Said second arm finished actuation at the returned position by biasing said connecting link through a relatively short second torque arm, indicated by dimension 'a2', due to the acute angle between said connecting link and said second arm. Said first arm finishes actuation at said returned position by being biased by said connecting link through a relatively large first torque arm, indicated by dimension 'b1', due to the nearly prependicular orientation of said first arm with respect to said connecting link. As said arms rotate from the retensioned position to the returned position, sad second torque arm decreases and said first torque arm increases, proportionately speaking, faster than the declining output of said torsion springs 268 and 269 thereby creating a second torque at said output shaft which is increasing. The increase in said second torque is set to balance off the decline in said first torque such that the sum of said first and second torques yields an approximately constant torque which is used to actuate a quarter tun valve and presents a constant retensioning load to a controller actuator.

Said torsion springs preferably have the same wire diameter and are made from fthe same spring wire material and therefore have substantially the same maximum torque ratings. As the inner and outer torsion springs of said nested torsion springs have necessarily differing diameters and preferably have the same height and same maximum torque ratings, said inner torsion springs will have a higher spring rate than said outer torsion springs. Said inner torsion springs 267 and 269 have a spring rate such that they will reach full torque output with 145 degrees of tensioning. Said outer torsion springs 266 and 268 have a spring rate such that they will reach full torque with 235 degrees of tensioning. Said outer and inner torsion springs are differentially preloaded to the returned position by giving said outer torsion springs 90 degrees more preload than said inner torsion springs. Said outer torsion springs are preloaded by 145 degrees and said inner torsion springs are preloaded by 55 degrees. Said differential preload enables said inner and said outer torsion springs to all reach their full torque ratings at the retensioned position. Said curved concentric slots 256 and 259 subtend an angle substantially equal to said extra preload required in said outer torsion springs over said inner torsion springs, ie. 90 degrees. Said curved slots enable the counterclockwise preloading of said outer torsion springs through said shafts and said spring plates to start while said spring ends of said inner torsion springs are at the most counterclockwise end position in said slots. When said extra preload is in said outer torsion springs, said spring plates and said slots have moved such that said spring ends of said inner torsion springs are at the most clockwise end position in said slots. Further tensioning results in the preloading of both inner and outer said torsion springs. When said nested torsion springs 268 and 269 are fully preloaded, then said stop 265 is installed. Then said nested torsion springs 266 and 267 are preloaded and said connecting link installed. Said frame is preferably cleared away above said connecting link at an intermediate position between said returned position and said retensioned position thereby permitting said installation of said connecting link.

After a quater turn actuation of said spring return actuator from the retensioned position to the returned position, I calculate that said inner torsion springs and said outer torsion springs have declined to about 38% and 62% of their full outputs respectively and released 85% and 62% of their energy respectively. The combined drop in output of said inner and outer torsion springs is approximately 50% and the combined energy release is approximately 71% of total capacity.

Said four bar linkage is set up in the following preferred manner allowing said second arm and said second shaft to rotate through a quarter turn and causing said first and second torque arms to change in the manner described. The length of said second arm, as measured from the center said second shaft to the center of said pin 292, is substantially the same as the length of said first arm, as measured from the center of said output shaft to the center of said pin 291. The center line of said frame link is indicated by line 'FL' in FIG. 23. The angle between 'FL' and said first arm at the retensioned position, indicated by 'A1', is substantially equal to the angle between 'FL' and said second arm at said returned position, indicated by 'A2', and the angle between 'FL' and said first arm at the returned position, indicated by 'B1', is substantially equal to the angle between 'FL' and said second arm at the retensioned position, indicated by 'B2'. From inspection, A1+B1+90=180 degrees, and since A1=A2 and B2=B2, then the rotation of said second shaft is 90 degrees. The retensioned and returned positions of said four bar linkage could be said to be symmetric across line 'S' or mirror images of each other. Said angles 'A1' and hence 'A2' are chosen to be less than 45 degrees so as to produce a relatively small said first torque arm between said connecting link and said first arm at the retensioned position, indicated by said dimension 'a1', and a relatively small said second torque arm between said connecting link and said second arm at said returned position, indicated by said dimension 'a2'. As a consequence, said angles 'B1' and 'B2' will be larger than 45 degrees and will produce a relatively large said first torque arm between said connecting link and said first little arm at the returned position, indicated by said dimension 'b1', and a relatively large said second torque arm between said connecting link and said second arm at the retensioned position, indicated by said dimension 'b2'. As a result of the symmetry, a1=a2 and b1=b2.

Given of the said 50% drop in the combined output of said nested torsion springs in this embodiment and the preferred symmetric setup of said four bar linkage, then for said four bar linkage to transform the output of said nested torsion springs 268 and 269 such that the total output of said spring return actuator is an approximately constant torque, I calculate that as said spring return actuator moves from the retensioned position to the returned position said first torque arm should be set so as to double and hence said second torque arm will decrease by half or a1=a2=($\frac{1}{2}$)b1=($\frac{1}{2}$)b2, through the appropriate selection of said angle 'A1'. The leverage in said four bar linkages between said nested torsion springs 268 and 269 and said output shaft, therefore, changes by a factor of four over a quarter turn actuation.

If in a particular embodiment, a higher percentage drop in spring output were to be used, then said leverage would have to change by greater factors in order to produce a substantially constant torque output.

To determine said first and second torque arms needed at the retensioned and returned positions to generate a substantially constant torque or some other output, an increasing torque for example, from a given set of torsion springs, the following simultaneous equations, which I derived, can be solved for a1/b2 and b1/a2, with due consideration given to the aforementioned relations, laws, and design parameters.

$$M_{SRA1} = M_{o1} + M_{Sa1}[a1/b1]$$

$$M_{SRA2} = M_{o2} + M_{Sa2}[b1/a2]$$

$$M_{SRA2} = kM_{SRA1}$$

k=1 (for constant torque)

Subscripts 1 and 2 refer to the retensioned and returned positions respectively.

$M_o$ and $M_{Sa}$—torques directly produced by torsion springs at said output shaft and said second arm respectively $M_{SRA}$—torque output of said spring return actuator k—see first embodiment According to my computations, the torque output of said spring return actuator is not exactly constant but has a slight wave form with an initial rise and subsequent dip on the order of ±3%. In my opinion these fluctuations are negligable.

If said four bar were to be set up to produce greater changes in leverage, in order for instance to generate an increasing torque at said output shaft or generate a constant torque from springs with a greater decline in output, then said connecting link could be made as a shaped link to be able to partially reach around said output and second shafts in order to generate smaller torque arms 'a1' and 'a2' or said first and second torque arms and said connecting link could be increased in size in order to generate larger torque arms 'b1' and 'b2', or both.

THIRD EMBODIMENT

FIGS. 24, 25, 26 and 27 illustrate a third embodiment of a spring return valve operator according to the invention and is directed toward a spring return valve operator which has substantially constant torque characteristics and uses a conventional fusible link, manual reset controlled actuator. The spring return actuator in this embodiment is a hybrid of the spring return actuators of the first and second embodiments.

A spring return actuator, generally indicated at 300, is comprised of rigid frame 305 into which bearings 306, 307, 308 and 309 are mounted, an output shaft assembly generally indicated below 310 and an eccentric spool assembly generally indicated below 320. Said frame is rigidly connected to the body of ball valve 301 by bracket 302 and bolts 303.

Within said output shaft assembly, output shaft 311 has a pair of flats at both ends forming double dee shaft ends and is keyed or coupled at its upper shaft end to spring plate 312, first arm 313 and handle 315 by conventional double dee shaft and hole features. Said output shaft, said spring plate, said first arm and said handle with sleeve 314 providing a journal surface, are rotatably mounted in said bearings 306 and 307. Nut 316 compresses said handle 315, said sleeve, said first arm and said spring plate together against the shoulder formed by the end of said upper double dee shaft end. Said first arm and said handle produce shoulders on either side of said bearing 306 and thereby axially position said output shaft and said first arm in said frame. The lower shaft end of said output shaft is coupled to valve stem 329 of said ball valve by split coupling 304. Said coupling is comprised of upper half 336, lower half 337 and dowel pins 338 and 339.

Nested torsion springs 317 and 318 mount around said output shaft, are connected between said frame and said spring plate, and bias said output shaft in the clockwise direction as seen from FIGS. 26 and 27. Stop 330 is installed after said nested torsion springs 317 and 318 are preloaded. Said stop is rigidly connected to said frame and defines the returned position of said valve operator by making contact with said first arm.

Within said eccentric spool assembly, shaft 321 is keyed or coupled at its upper end to spring plate 322 and eccentric spool 323 by a conventional double dee shaft end and hole feature. Said eccentric spool is a circular spool of radius, R, which has been mounted with eccentricity, e. Said shaft and said eccentric spool, with sleeve 324 providing a journal surface are rotatably mounted in said bearings 308 and 309. Said sleeve and retaining ring 325 position said eccentric spool and said spring plate against the shoulder formed by said double dee shaft end. Said eccentric spool and said retaining ring produce shoulders on either side of said bearing 308 and thereby axially position said eccentric spool assembly in said frame.

Nested torsion springs 335 and 334 mount around said shaft and are connected between said frame and the combination of said spring plate and said eccentric spool such that said eccentric spool is biased in the clockwise direction as seen from FIG. 26.

Inner said torsion springs 317 and 334 reach full tension with 270 degrees of tensioning. Outer said torsion springs 318 and 335 reach full tension with 360 degrees of tensioning. Said outer and inner springs are differentially preloaded by giving said outer and inner torsion springs 180 and 90 degrees of preload respectively. This differential preload enables said inner and said outer torsion springs to both reach a state of full tensioning at the retensioned position.

Said first arm operates through a quarter turn and has a conventional clevis at its outer end which holds clevis pin 319. Said eccentric spool, which operates through substantially a half turn, has two parallel cable grooves over its periphery for engaging, taking up and letting out cable 340. Pocket 327, located in the side of said eccentric spool over which said cable does not take up or let out, forms a clevis type feature for holding cable turn pin 328. Said cable has cable terminals 341 at each end and is preferably of a more flexible construction. Said cable is looped so as to form two equal length legs. Said cable terminals connect to said clevis pin and said cable loops once over said turn pin. Said cable legs wrap on said eccentric spool in said two parallel cable grooves. The bias produced at said eccentric spool by said torsion springs causes said cable to slide through said cable loop until all slack is removed and said cable legs are in a state of substantially equal tension. Said cable is installed after said nested torsion springs are preloaded.

The diameter of said half turn eccentric is sized to take up the cable let out by said quarter turn first arm and therefore said eccentric spool diameter is slightly less than the radius of said first arm.

Frame extension 331 rigidly connects to said frame. Fusible link 332 is connected between said frame extension and said handle by screws 333. Said fusible link holds or restrains said handle and therefore said spring return actuator at the retensioned position. When a high temperature, as for example caused by a fire, melts said fusible link, said handle is no longer restrained and said spring return actuator rotates to said returned position thereby actuating said ball valve to the desired position under the circumstances, either opened or closed. Actuation back to said retensioned position is accomplished by manually rotating said handle a quarter turn counterclockwise and installing said fusible link, as shown in FIG. 25.

Within said spring return actuator, said nested torsion springs 317 and 318 bias said output shaft and produce a first torque over a quarter turn which is declining. Said nested torsion springs 334 and 335 bias said eccentric spool and produce a torque over a half turn which is declining. Said eccentric spool, said first arm and said interconnecting cable function as a device for transforming the bias produced by said torsion springs 335 and 334 and transmitting said transformed bias to said output shaft. At said output shaft said transformed bias is combined with the untransformed bias of said torsion springs 317 and 318 to produce a loadmatching substantially constant torque. In more detail, said eccentric spool starts actuation from said retensioned position by taking up said cable legs over a relatively large torque arm defined by R+e. Said first arm starts actuation from said retensioned position by being biased by said cable legs through a relatively short torque arm due to the acute angle 'A', approximately 45 degrees, between said cable legs and said first arm. Said eccentric spool rotates clockwise a half turn and finishes actuation at said returned position by biasing said cable over a relatively small torque arm defined by R−e. Said first arm finishes actuation at said returned position by being biased by said cable legs through a relatively large torque arm due to the nearly perpendicular orientation of said cable legs with respect to said first arm, see angle 'B' in FIG. 27. As said eccentric spool and said first arm rotate from said retensioned position to said returned position, said torque arm generated by said eccentric spool decreases and said torque arm generated by said first arm increases, proportionately speaking, faster than the declining output of said torsion springs 334 and 335 thereby creating a second torque at said output shaft which is increasing. The increase in said second torque is set to balance off the decline in said first torque such that the sum of said first and second torques yields an approximately constant torque which is used to actuate said ball valve and presents a constant retensioning load.

After actuation of said spring return actuator to said returned position, I calculate that said half turn inner and outer torsion springs 334 and 335 release about 89% and 75% of their energy respectively and said quarter turn inner and outer torsion springs 317 and 318 release about 56% and 44% of their energy respectively. Therefore, about 65% of the total energy storage capability of said springs is used to generate the constant torque at said output shaft.

FOURTH EMBODIMENT

FIG. 28 illustrates a fourth embodiment of a spring return valve operator according to the invention and is directed toward spring return valve operators which are loadmatched to quarter turn valves which present load characteristics which are not constant and in particular which present an increasing load as they close.

Said valve operator is comprised of a spring return actuator 402, a pneumatic actuator 400, and a bias transmitting and transforming device in the form of a double eccentric spool and cable generally indicated at 405. A quarter turn butterfly valve is generally indicated at 413. Output shaft 404 of said spring return actuator couples to shaft 418 which then couples to valve stem 420. Output shaft 401 of said pneumatic actuator couples to shaft 416 and shaft extension 403.

The valve load of said butterfly valve increases as it closes and decreases as it opens. The returned position of said valve is the closed position and the retensioned position of said valve is the open position. FIG. 28 shows said valve operator and said valve at said returned position.

Said spring return actuator is constructed in a similar manner to the spring return actuator of the first embodiment except that the concentric spool is now preferably an eccentric spool and no torsion springs surround and directly bias said output shaft 404. Nested torsion springs 426, not shown in detail, bias second eccentric spool 423 and thence first cable connection 424, first eccentric spool 425 and said output shaft 404. Said nested torsion springs are capable of 360 and 270 degrees of tensioning, are differentially preloaded so that both said torsion springs reach their full output at the retensioned position, and with said second eccentric spool are used over a half turn actuation. Said first eccentric spool and said output shaft produce a quarter turn actuation in the clockwise direction as seen from FIG. 28. Said torsion springs release a high fraction of their energy storage capacity during actuation, I calculate approximately 81% of the combined capacity. Said first eccentric spool and said first cable connection define a first torque arm which is relatively small at said retensioned position and relatively large at said returned position. Said second eccentric spool and said first cable connection define a second torque arm which is relatively large at said retensioned position, substantially equal to R+e, and relatively small at said returned position, substantially equal to R−e. Said springs are of such capacity and said eccentric spools have sufficient eccentricity such that the declining output of said springs is transformed into an increasing torque at said output shaft which is substantially load matched to said valve load.

It will be noted that if in said butterfly valve the butterfly positively contacts and presses against the valve seat at the closed position in order to produce a tight shutoff, then the operating returned position of said spring return actuator and said valve operator as a whole will be defined by the contact of said butterfly with said valve seats rather than by a stop (not shown in FIG. 28, but see first embodiment FIGS. 15 and 18) in said spring return actuator. A stop, however is still needed in said spring return actuator in order to retain the preload in said torsion springs when said spring return actuator is not installed on said valve. During actuation by said spring return actuator from the retensioned position to the returned position, ideally said operating returned position defined by said valve would occur slightly before said returned position define by said stop. As an aid in installing said spring return actuator on said valve so that said returned position does not have to be shifted during the process of connecting the bracket and coupling therebetween which would require the external application of a torque, said stop could include a conventional set screw adjustment feature. Said adjustment would enable the shifting of said returned position defined by said stop from slightly before said operating returned position defined by said valve, which would be used during installation thereby enabling the unstressed connecting of said bracket and coupling, to slightly after said operating returned position defined by said valve when installation is complete thereby enabling tight shutoff.

Said pneumatic actuator is constructed in the same manner as the pneumatic actuator of said first embodiment and produces a constant torque output over a quarter turn in the counterclockwise direction from said returned position to said retensioned position.

Said bias transmitting and transforming device is comprised of two eccentric spools 406 and 407 and a second cable connection 408. Third eccentric spool 407 couples to said shaft 418 and fourth eccentric spool 406 couples to shaft 416. Said eccentric spools are substantially the same diameter and operate through a quarter turn. Second second cable connection, preferably a single cable which is looped into multiple legs as described in the first embodiment, is connected to said third and fourth eccentric spools at 421 and 422 respectively, wraps on the peripheries of said third and fourth eccentric spools, and forms a tensioned connection therebetween. Said third eccentric spool and said second cable connection define a third torque arm which is relatively small at said retensioned position, substantially equal to R−e, and relatively large at said returned position, substantially equal to R. Said fourth eccentric spool and said second cable connection define a fourth torque arm which is relatively large at said retensioned position, substantially equal to R, and relatively small at said returned position, approximately equal to R−e.

Keeper arm 409 is rotatably mounted or journaled to said shaft 418 and passes underneath said second cable connection and said third eccentric spool 407, as seen from FIG. 28. Pin 429 is rigidly mounted to the end of said keeper arm. Roller 428 is rotatably mounted to said pin. Said pin is of such height as to enable said roller to be in the same plane as said third and fourth eccentric spools and said second cable connection. Spring 411 is connected between frame 412, shown only in part, and said keeper arm and pulls said roller against said second cable connection.

The operation of said valve operator is as follows. Said spring return actuator actuates said valve stem a quarter turn clockwise, as seen from FIG. 28, from said retensioned position to said returned position and in addition rotates said eccentric spool 407 a quarter turn clockwise, taking up said second cable connection, causing said eccentric spool 406 to retate a quarter turn clockwise and thereby returning said pneumatic actuator to its returned position. Within said spring return actuator, as said first and second eccentric spools rotate from said retensioned position to said returned position, said second torque arm decreases and said first torque arm increases thereby generating an increasing leverage and transforming the declining bias of said springs into an increasing torque at said output shaft and valve stem which is load matched to said valve load.

Said pneumatic actuator biases said shaft 416 and produces a constant torque, quarter turn counterclockwise actuation, as seen from FIG. 28, from said returned position to said retensioned position. Said pneumatic actuator acts through said bias transmitting and transforming device to open said valve and retension said spring return actuator. Said pneumatic actuator acts through said bias transmitting and transforming device by biasing and rotating said fourth eccentric spool in the counterclockwise direction with thence biases said second cable connection and said third eccentric spool in the counterclockwise direction. As said third and said fourth eccentric spools rotate from said returned position to said retensioned position, said fourth eccentric spool takes up said second cable connection and said fourth torque arm increases from substantially R−e to substantially R while said third eccentric spool lets out said cable connection and said third torque arm decreases from substantially R to substantially R−e thereby generating a decreasing leverage and transforming the constant torque output of said pneumatic actuator into a decreasing torque at said valve stem which is load matched to said valve load and said spring return actuator retensioning load.

FIG. 6 generally illustrates the loads and respective actuator outputs for this embodiment.

Said output shaft 404, which extends from the top of said spring return actuator, is the preferred location for mounting shaft position indicating and sensing devices such as limit switches or a valve positioner.

Said shaft extension 403, which extends from the top of said pneumatic actuator is the preferred location for attachment of a manual override actuator as the manual actuation will have the benefit of the loadmatching leverage provided by said bias transmitting and transforming device. Should manual override be attempted from said output shaft 404, however, said third eccentric spool will rotate thereby letting out some of said second cable connection, but should fourth eccentric spool will not rotate to take up said cable connection. As said second cable connection is let out, said keeper arm rotates counterclockwise under the action of said spring 411 and said pin and roller thereby force said second cable connection into the space between said first and second eccentric spools, causing all the slack in said cable connection to be taken up between both said eccentric spools, and providing a small amount of cable tension to keep said cables seated in their respective grooves on said eccentric spools. This action is shown in dotted lines in FIG. 28.

It will be noted that if the valve load in the returning direction is not equal to the valve load in the retensioning direction, then said spring return actuator would be substantially loadmatched to the valve load in the returning direction and said pneumatic actuator, through said bias transmitting and transforming device, would be load matched to said valve load in the retensioning direction plus the spring return actuator retensioning load.

It will also be noted that bias transmitting and transforming devices based on four bar linkage similar to and adapted from that of the second embodiment or hybrids between double eccentric spool devices and four bar linkage along the lines the third embodiment are also suitable for loadmatching said pneumatic actuator to said valve load and said spring return actuator retensioning load.

FIFTH EMBODIMENT

FIG. 29 illustrates a fifth embodiment of a spring return valve operator according to the invention and is directed toward spring return valve operators which are loadmatched to quarter turn valves which present load characteristics which are not constant and in particular which present an increasing load as they close.

Said valve operator is comprised of a spring return actuator 430, a pneumatic actuator 432, and a bias transmitting and transforming device in the form of a four bar linkage generally indicated at 434. Output shaft 431 of said spring return actuator couples to shaft 433 of said pneumatic actuator which in turn couples to shaft 446. A quarter turn butterfly valve is generally indicated at 440. Valve stem 450 couples to shaft 448. An alternative four bar linkage is shown in FIG. 30.

The valve load of said butterfly valve increases as it closes. The returned position of said valve is the closed position and the retensioned position of said valve is the open position. FIG. 29 shows said valve operator and said valve at said returned position.

Said spring return actuator is constructed in the same or equivalent manner to spring return actuator of the first embodiment and produces a substantially constant torque output over a quarter turn in the clockwise direction, as seen from FIG. 29, from the retensioned position to the returned position.

Said pneumatic actuator is constructed in the same manner as the pneumatic actuator of the first embodiment and produces a constant torque output over a quarter turn in the counterclockwise direction from said returned position to said retensioned position.

Said four bar linkage is comprised of first arm 437, second arm 435, connecting link 436 and a frame link which is not shown. The returned position of said four bar is shown in solid lines in FIG. 29 while the retensioned position of said four bar is shown in dashed lines. Said first arm is coupled to shaft 448 and to said valve stem. Said second arm is coupled to said shaft 446 and thence to said pneumatic actuator and said spring return actuator. Said connecting link is rotatably connected to said first and second arms through conventional pin joints 438 and 439. Said four bar is a symmetric four bar linkage with the general properties described in the second embodiment. Therefore, said first and second arms both operate through a quarter turn and are the same length. Said first arm and said connecting link define a first torque arm which is relatively large at said returned position and relatively small at said retensioned position. Said second arm and said connecting link define a second torque arm which is relatively small at said returned position and relatively large at said retensioned position. Said small second torque arm at said returned position is substantially equal to said small first torque arm at said retensioned position. Said large second torque arm at said retensioned position is substantially equal to said large first torque arm at said returned position. The smaller said second torque arm at said returned position and said first torque arm at said retensioned position are made, the greater the change in leverage will be. Said small first and second torque arms at said retensioned and said returned position respectively are selected to generate a change in leverage which will substantially loadmatch said spring return actuator and said pneumatic actuator to said valve load.

The operation of said valve operator is as follows. Said spring return actuator produces a constant torque, quarter turn, clockwise actuation from said retensioned position to said returned position. Said spring return actuator is sized such that the actuation energy released by said spring return actuator is substantially equal to or slightly greater than the valve load energy. Said spring return actuator thereby returns said pneumatic actuator, which presents a minimal load, to said returned position and acts through said four bar to generate an increasing torque output, which is loadmatched to said valve load, and actuates said valve to said returned position, which in this embodiment is the closed position. Said pneumatic actuator produces a constant torque, quarter turn, counterclockwise actuation from said returned position to said retensioned position. The torque produced by said pneumatic actuator is substantially twice that of said spring return actuator and the actuation energy produced by said pneumatic actuator is substantially the valve load energy plus the spring retensioning load energy or twice the valve load energy. From said pneumatic actuator, half of said torque therefore retensions said spring return actuator and the other half of said torque acts through said four bar to meet the valve load and actuates said valve to said retensioned position against a decreasing load.

As said first and second arms of said four bar rotate from said retensioned position to said returned position, said second torque arm decreases and said first torque arm increases thereby producing an increasing leverage and transforming the substantially constant torque output of said spring return actuator into an increasing torque at said valve stem which is substantially loadmatched to said increasing valve load. As said first and second arms of said four bar rotate from said returned position to said retensioned position, said first torque arm decreases and said second torque arm increases thereby producing a decreasing leverage and transforming substantially one half the constant torque output of said pneumatic actuator into a decreasing torque at said valve stem which is substantially loadmatched to said valve load. The other half of the constant torque output of said pneumatic actuator is already loadmatched to said spring return actuator.

Said shaft 448 which is directly coupled to said valve stem is the preferred location for mounting shaft position indicating and sensing devices such as limit switches or a valve positioner.

Said output shaft 431, which extends from the top of said spring return actuator is the preferred location for attachment of a manual override actuator as the manual actuation will have the benefit of the loadmatching leverage provided by said four bar.

An alternate four bar linkage is shown in FIG. 30. Arms 460 and 462 are of equal length, both said arms operate through a quarter turn, and said four bar is symmetric between its returned and retensioned positions. The solid outline indicates the returned position and the dotted outline indicates the retensioned position. To produce an increasing torque as said returned position is approached, shaft 466 couples to a constant torque valve operator and shaft 465 couples to a valve stem. Unlike the four bar of FIG. 29 which generates a small torque arm by producing an acute angle between an arm and the connecting link, the four bar of FIG. 30 generates a small torque arm by producing an obtuse angle between a said arm and connecting link 461.

It will be seen that the objectives of the invention have been met and the problems and tradeoff in the prior art overcome in an efficient manner.

Since many alternatives to and variations in the above embodiments are possible without departing from the scope of he invention, it is intended that the above descriptions and drawings, which contain many specific features, should be interpreted in an illustrative sense and should not be construed as limiting the scope of the invention. Accordingly, the scope of the invention should not be determined from the above descriptions and drawings, but from the following claims and their legal equivalents.

I claim:

1. A spring return valve operator for operating a valve member comprising:
    (A) spring actuating means;
    (B) bias transmitting and transforming means comprising:
        (1) spooling means for generating a varying torque arm;
        (2) flexible element means which form a wrapped connection with said spooling means and which with said spooling means generate a varying torque arm;
    (C) controlled actuating means which connect to a valve member and to said bias transmitting and transforming means;
    (D) said spring actuating means connect to and apply a first bias to said bias transmitting and transforming means, said bias transmitting and transforming means thence connect to and apply a transformed version of said first bias to said valve member for actuating said valve member in a direction toward a returned position, said bias bransmitting and transforming means present a transformed version of said first bias as a retensioning load to said controlled actuating means;
    (E) said controlled actuating means can apply a second bias to said valve member and said bias transmitting and transforming means, said second bias being applied to said valve member for actuating said valve member in a direction away from said returned position and said second bias being applied to said bias transmitting and transforming means for retensioning said spring actuating means.

2. A valve operator as defined in claim 1 wherein said flexible element means are additionally comprised of a cable which has been looped over looping means to form multiple cable legs, said looping means allowing said cable legs to adjust to a state of substantially equal tension.

3. A valve operator as defined in claim 2 wherein said spooling means for generating a varying torque arm are further comprised of eccentrically mounted substantially circular spooling means.

4. A valve operator as defined in claim 1 wherein:
(A) said bias transmitting and transforming means function in cooperation with said spring actuating means such that said transformed version of said first bias, plus the output from any other spring actuating means employed for producing a return bias for actuating said valve member in a direction toward said returned position, has a magnitude which lies in a ±10% range during actuation from the retensioned position to said returned position and more than 36% of the energy storage capacity of said spring actuating means is released during actuation from the retensioned position to said returned position, thereby leaving less than 64% of the energy storage capacity of said spring actuating means as preload energy;
(B) said controlled actuating means produce a substantially constant said second bias during actuation from said returned position to said retensioned position.

5. A valve operator as defined in claim 1 wherein said spring actuating means connect to said spooling means for generating a varying torque arm, and said flexible element means connect thence to said valve member, said spooling means for generating a varying torque arm and said flexible element means enable said first bias from said spring actuating means to act through decreasing torque arm means which generate increasing leverage.

6. A valve operator as defined in claim 5 wherein said spring actuating means comprise torsion spring actuating means which connects to said spooling means for generating a varying torque arm, the axis of rotation of said torsion spring actuating means being substantially in line with the axis of rotation of said spooling means for generating a varying torque arm.

7. A spring return valve operator for operating a quarter turn valve member comprising:
(A) rigid supporting means which are mounted to a quarter turn valve member;
(B) spring actuating means which are mounted to said rigid supporting means;
(C) bias transmitting and transforming means;
(D) controlled actuating means which connect to said valve member and to said bias transmitting and transforming means;
(E) said spring actuating means connect to and apply a first bias to said bias transmitting and transforming means, said bias transmitting and transforming means thence connect to and apply a transformed version of said first bias to said valve member for actuating said valve member in a direction toward a returned position, said bias transmitting and transforming means present a transformed version of said first bias as a retensioning load to said controlled actuating means;
(F) said controlled actuating means can apply a second bias to said valve member and said bias transmitting and transforming means, said second bias being applied to said valve member for actuating said valve member in a direction away from said returned position and said second bias being applied to said bias transmitting and transforming means for retensioning said spring actuating means;
(G) said bias transmitting and transforming means comprising:
(1) quarter turn torque arm generating means which are rotatably mounted with respect to said rigid supporting means and which produce a substantially quarter turn output motion for actuating said valve member;
(2) varying torque arm generating means which are rotatably mounted with respect to said rigid supporting means, which connect to said quarter turn torque arm generating means and which enable said first bias from said spring actuating means to act through decreasing torque arm generating means which generate increasing leverage.

8. A valve operator as defined in claim 7 wherein said spring actuating means are comprised of torsion spring actuating means which are connected between said rigid supporting means and said varying torque arm generating means, the axis of rotation of said torsion spring actuating means being substantially in line with the axis of rotation of said varying torque arm generating means.

9. A valve operator as defined in claim 8 wherein:
(A) said quarter turn torque arm generating means further comprise a quarter turn output shaft which couples to the valve stem of said valve member,
(B) additional torsion spring actuating means mount around said output shaft and connect between said rigid supporting means and said output shaft and apply an additional bias to said valve member for actuating said valve member in a direction toward said returned position.

10. A valve operator as defined in claim 7 wherein:
(A) said quarter turn torque arm generating means comprise a quarter turn first arm link;
(B) said varying torque arm generating means comprise:
(1) a second arm link;
(2) a connecting link which is rotatably connected to said second arm link;
(C) said connecting link is rotatably connected to said quarter turn first arm link thereby forming a four bar linkage.

11. A valve operator as defined in claim 10 wherein said four bar linkage is comprised of a substantially symmetric four bar linkage.

12. A valve operator as defined in claim 10 wherein said spring actuating means are comprised of torsion spring actuating means which are connected between said rigid supporting means and said second arm link, the axis of rotation of said torsion spring actuating means being substantially in line with the axis of rotation of said second arm link.

13. A valve operator as defined in claim 7 wherein said varying torque arm generating means comprises:
(1) spooling means for generating a varying torque arm;
(2) flexible element means which form a wrapped connection with said spooling means and which with said spooling means generate a varying torque arm.

14. A valve operator as defined in claim 13 wherein said spooling means for generating a varying torque arm are further comprised of eccentrically mounted substantially circular spooling means.

15. A valve operator as defined in claim 14 wherein said flexible element means are additionally comprised of a cable which has been looped over looping means to form multiple cable legs, said looping means allowing said cable legs to adjust to a state of substantially equal tension.

16. A valve operator as defined in claim 15 wherein said spring actuating means is comprised of torsion spring actuating means which are connected between said rigid supporting means and said eccentric spooling means, the axis of rotation of said torsion spring actuating means being substantially in line with the axis of rotation of said eccentric spooling means.

17. A valve operator as defined in claim 7 wherein said controlled actuating means connect to second means for bias transmitting and transforming which thence connect to said valve member and first said bias transmitting and transforming means.

18. A valve operator as defined in claim 7 wherein said controlled actuating means and said bias transmitting and transforming means connect to second means for bias transmitting and transforming which thence connect to said valve member.

19. A valve operator as defined in claim 7 wherein said controlled actuating means is comprised of:
(A) retensioning means for actuating said quarter turn valve from said returned position to the retensioned position;
(B) means for holding said retensioned position in opposition to said transformed version of said first bias and for releasing from said retensioned position thereby allowing said spring actuating means and said bias transmitting and transforming means to actuate said quarter turn valve member to said returned position.

20. A valve operator as defined in claim 19 wherein said retensioning means is comprised of a handle and said means for holding and for releasing is comprised of a fusible link which connects between said handle and said rigid supporting means.

21. A valve operator as defined in claim 7 wherein:
(A) said bias transmitting and transforming means function in cooperation with said spring actuating means such that said transformed version of said first bias, plus the output from any other spring actuating means employed for producing a return bias for actuating said valve member in a direction toward said returned position, has a magnitude which lies in a ±10% range during actuation from the retensioned position to said returned position and more than 36% of the energy storage capacity of said spring actuating means is released during actuation from the retensioned position to said returned position, thereby leaving less than 64% of the energy storage capacity of said spring actuating means as preload energy;
(B) said controlled actuating means produce a substantially constant said second bias during actuation from said returned position to said retensioned position.

22. A valve operator as defined in claim 21 wherein said controlled actuating means comprise fluid power actuating means.

23. A valve actuator comprising:
(A) rigid frame;
(B) concentric spool member which is rotatably mounted to said rigid frame;
(C) reciprocating positive dispacement fluid power actuating means comprising:
(1) pressurable reciprocating means having an axis of reciprocation which passes through the center of force of said pressurable reciprocating means;
(2) a housing which connects to said rigid frame;
(D) extension means which connect to said pressureable reciprocating means;
(E) first flexible element means;
(F) second flexible element means;
(G) said concentric spool is located such that the periphery of said concentric spool is substantially tangent to said axis of reciprocation thereby defining a tangency and a tangent plane;
(H) first flexible element connecting means which connects said first flexible element means to said pressureable reciprocating means at a position substantially in said tangent plane;
(I) second flexible element connecting means which connects said second flexible element means to said extension means at a position substantially in said tangent plane;
(J) said concentric spool member being additionally located such that said tangency is always between said first flexible element connecting means and said second flexible element connecting means;
(K) said first flexible element means connect between said first flexible element connecting means and said concentric spool member and forms a wrapped connection with said concentric spool member;
(L) said second flexible element means connect between said second flexible element means and said concentric spool member and forms a wrapped connection with said concentric spool member.

24. A valve operator as defined in claim 23 wherein: said first flexible element means is comprised of a cable which has been looped over first looping means to form first cable legs which are symmetrically located on each side of said axis of reciprocation, said first looping means allowing said first cable legs to adjust to a state of substantially equal tension, said second flexible element means is comprised of a cable which has been looped over second looping means to form second cable legs which are symmetrically located on each side of said axis of reciprocation, said second looping means allowing said second cable legs to adjust to a state of substantially equal tension; and additionally comprises: cable tensioning means.

25. A valve operator as defined in claim 23 wherein sliding coupling means allow reciprocation of said pressurable reciprocating means and said extension means but prevent rotation of said pressurable reciprocating means and said extension means.

26. A spring return valve operator for operating a quarter turn valve member comprising:
(A) rigid supporting means which are mounted to a quarter turn valve member;
(B) spring actuating means which are mounted to said rigid supporting means;
(C) bias transmitting and transforming means;
(D) controlled actuating means which connect to said quarter turn valve member and to said bias transmitting and transforming means;
(E) said spring actuating means connect to and apply a first bias to said bias transmitting and transforming means, said bias transmitting and transforming means thence connect to and apply a transformed version of said first bias to said valve member for actuating said valve member in a direction toward a returned position, said bias transmitting and transforming means present a transformed version of said first bias as a retensioning load to said controlled actuating means;
(F) said controlled actuating means can apply a second bias to said valve member and said bias transmitting and transforming means, said second bias being applied to said valve member for actuating said valve member in a direction away from said returned position and said second bias being applied to said bias transmitting and transforming means for retensioning said spring actuating means;
(G) said bias transmitting and transforming means comprising:
(1) rigid torqueing means for generating a varying torque arm which are rotatably mounted with respect to said rigid supporting means;
(2) force transmitting means which act on said rigid torqueing means and which with said torqueing means generate a varying torque arm and consequent varying leverage through which said spring actuating means act on said quarter turn valve member wherein the leverage at said returned position is greater than the leverage at said retensioned position;
(3) said force transmitting means being supported and guided by means which are rotatably mounted with respect to said rigid supporting means thereby reducing frictional effects and causing said force transmitting means to follow a curvilinear path during actuation between the retension position and said returned position.

27. A valve operator as defined in claim 26 wherein said force transmitting means are offset to the axis of rotation of said rigid torqueing means for generating a varying torque arm.

28. A valve operator as defined in claim 26 wherein said force transmitting means and said rigid torqueing means for generating a varying torque arm are pivotally connected.

29. A valve operator as defined in claim 26 wherein:
(A) said bias transmitting and transforming means function in cooperation with said spring actuating means such that said transformed version of said first bias, plus the output from any other spring actuating means employed for producing a return bias for actuating said valve member in a direction toward said returned position, has a magnitude which lies in a ±10% range during actuation from the retensioned position to said returned position and more than 36% of the energy storage capacity of said spring actuating means is released during actuation from the retensioned position to said returned position, thereby leaving less than 64% of the energy storage capacity of said spring actuating means as preload energy;
(B) said controlled actuating means produce a substantially constant said second bias during actuation from said returned position to said retensioned position.

30. A valve operator as defined in claim 26 wherein said bias transmitting and transforming means function in cooperation with said spring actuating means such that more than 50% of the spring energy which is stored in said spring actuating means at the retensioned position is used to meet the valve load of said valve member thereby wasting less than 50% of the spring energy storage capacity of said spring actuating means through waste actuation energy and waste preload energy.

31. A spring return valve actuator for use in a valve operator for operating a quarter turn valve member, comprising:
(A) rigid supporting means which are mounted to a quarter turn valve member;
(B) actuating means which are mounted to said rigid supporting means;
(C) bias transmitting and transforming means comprising:
(1) spoolng means for generating a varying torque arm which are rotatably mounted with respect to said rigid supporting means;
(2) flexible element means which form a wrapped connection with said spooling means and which with said spooling means generate a varying torque arm;
(3) means for generating a torque arm over substantially a quarter turn which are rotatably mounted with respect to said rigid supporting means and which connect to said flexible element means;
(D) said actuating means connect to said spooling means for generating a varying torque arm of said bias transmitting and transforming means and said means for generating a torque arm over substantially a quarter turn of said bias transmitting and transforming means connect to said quarter turn valve;
(E) said actuating means apply a bias to said bias transmitting and transforming means, said bias transmitting and transforming means thence apply a transformed version of said bias to said quarter turn valve member, said spooling means for generating a varying torque arm and said flexible element means of said bias transmitting and transforming means enabling said bias of said actuating means to act through decreasing torque arm means which generate increasing leverage.

32. A valve actuator as defined in claim 31 wherein said flexible element means are additionally comprised of a cable which has been looped over looping means to form multiple cable legs, said looping means allowing said cable legs to adjust to a state of substantially equal tension.

33. A valve actuator as defined in claim 31 wherein said spooling means for generating a varying torque arm are eccentrically mounted substantially circular spooling means and said means for generating a torque arm over substantially a quarter turn comprise concentric spooling means.

34. A valve actuator as defined in claim 31 wherein said spooling means for generating a varying torque arm are eccentrically mounted substantially circular spooling means and said means for generating a torque arm over substantially a quarter turn comprise means for generating a varying torque arm.

35. A valve actuator as defined in claim 31 wherein said actuating means comprise torsion spring actuating means.

36. A spring return valve operator for operating a a quarter turn valve member comprising:
(A) rigid supporting means which are mounted to a quarter turn valve member;
(B) nested torsion spring actuating means which are comprised of nested torsion springs and which are mounted to said rigid supporting means;
(C) bias transmitting and transforming means comprising varying torque arm generating means for producing varying leverage;

(D) controlled actuating means;

(E) said nested torsion spring actuating means connect to said bias transmitting and transforming means which thence connect to said controlled actuating means, said bias transmitting and transforming means and said controlled actuating means additionally connect to said quarter turn valve member;

(E) said nested torsion spring actuating means apply a first bias to said bias transmitting and transforming means, said bias transmitting and transforming means thence apply a transformed version of said first bias to said quarter turn valve member for actuating said quarter turn valve member in a direction toward a returned position, said bias transmitting and transforming means present a transformed version of said first bias as a retensioning load to said controlled actuating means;

(F) said controlled actuating means can apply a second bias to said said quarter turn valve member and said bias transmitting and transforming means, said second bias being applied to said quarter turn valve member for actuating said quarter turn valve member in a direction away from said returned position and said second bias being applied to said bias transmitting and transforming means for retensioning said nested torsion spring actuating means.

37. A valve operator as defined in claim 36 wherein said nested torsion springs are differentially preloaded.

38. A modular spring return valve operator for operating a quarter turn valve member comprising:
   (A) a spring return actuator module comprising:
      (1) rigid frame having upper and lower bracket connecting means;
      (2) spring actuating means which are mounted to said rigid frame;
      (3) bias transmitting and transforming means comprising varying torque arm generating means for producing varying leverage;
      (4) substantially quarter turn output shaft, said output shaft comprising upper and lower male shaft ends with substantially identical coupling features;
      (5) said spring actuating means connect to said bias transmitting and transforming means which thence connect to said quarter turn output shaft;
   (B) a pneumatic actuator module comprising:
      (1) rigid frame having upper and lower bracket connecting means;
      (2) substantially quarter turn output shaft comprising upper and lower female shaft ends with substantially identical coupling features;
   (C) quarter turn valve member having a valve body and a quarter turn valve stem;
   (D) first nesting coupling means which nests between and couples said valve stem to said lower female shaft end of said pneumatic actuator module;
   (E) first bracket means which connect said valve body with said lower bracket connecting means of said pneumatic actuator module;
   (F) second nesting coupling means which nests between and couples said output shaft of said spring return actuator module to said upper female shaft end of said pneumatic actuator module;
   (G) second bracket means which connect said rigid frame of said spring return actuator module with said upper bracket connecting means of said pneumatic actuator module;
   (H) said first coupling means and said first bracket means permit 90 degree indexing of said pneumatic actuator module with respect to said valve member;
   (I) said second coupling means and said second bracket means permit 90 degree indexing of said pneumatic actuator module with respect to said spring actuator module.

39. A spring return valve operator for operating a quarter turn valve member comprising:
   (A) spring actuating means;
   (B) first bias transmitting and transforming means comprising varying torque arm generating means for producing varying leverage wherein the leverage produced at the return position differs by at least 20% from the leverage produced at the retensioned position;
   (C) controlled actuating means;
   (D) quarter turn valve member;
   (E) said spring actuating means connect to said bias transmitting and transforming means which thence connect to said controlled actuating means, said spring actuating means and said first bias transmitting and transforming means additionally connect to said quarter turn valve member;
   (F) said spring actuating means apply a first bias to said quarter turn valve member for actuating said quarter turn valve member in a direction toward a returned position;
   (G) said controlled actuating means can apply a second bias to said first bias transmitting and transforming means, said first bias transmitting and transforming means thence apply a transformed version of said second bias to said spring actuating means for retensioning said spring actuating means and to said quarter turn valve member for actuating said quarter turn valve member in a direction away from said returned position.

40. A valve operator as defined in claim 39 further comprising:
   (A) second bias transmitting and transforming means comprising varying torque arm means for generating varying leverage;
   (B) said spring actuating means connect to said second bias transmitting and transforming means, said second bias transmitting and transforming means thence connect to said quarter turn valve member and said first bias transmitting and transforming means.

41. A valve operator as defined in claim 40 wherein said first bias transmitting and transforming means further comprise:
   (1) quarter turn torque arm generating means which produce a substantially quarter turn output motion for actuating said quarter turn valve member;
   (2) said varying torque arm generating means connect to said quarter turn torque arm means and enable said first bias from said spring actuating means to act through decreasing torque arm generating means which generate increasing leverage.

42. A valve operator as defined in claim 41 wherein said varying torque arm generating means of said first bias transmitting and transforming means comprise:
   (1) spooling means for generating a varying torque arm;
   (2) flexible element means which form a wrapped connection with said spooling means and which with said spooling means generate a varying torque arm.

43. A spring return valve operator for operating a quarter turn valve member comprising:
(A) spring actuating means;
(B) first bias transmitting and transforming means comprising varying torque arm generating means for producing varying leverage;
(C) second bias transmitting and transforming means comprising varying torque arm generating means for producing varying leverage;
(D) controlled actuating means;
(E) quarter turn valve member;
(F) said spring actuating means connect to said first bias transmitting and transforming means which thence connect to said controlled actuating means, said first bias transmitting and transforming means and said controlled actuating means connect to said second bias transmitting and transforming means which thence connect to said quarter turn valve member;
(G) said spring actuating means apply a first bias to said first bias transmitting and transforming means, said first bias transmitting and transforming means thence apply a first transformed version of said first bias to said second bias transmitting and transforming means, said second bias transmitting and transforming means thence apply a second transformed version of said first bias to said quarter turn valve member for actuating said quarter turn valve member in a direction toward a returned position, said first bias transmitting and transforming means present said first transformed version of said first bias as a retensioning load to said controlled actuating means;
(H) said controlled actuating means can apply a second bias to said first bias transmitting and transforming means and said second bias transmitting and transforming means, said second bias transmitting and transforming means thence apply a first transformed version of said second bias to said quarter turn valve member for actuating said quarter turn valve member in a direction away from said returned position, said second bias being applied to said first bias transmitting and transforming means for retensioning said spring actuating means.

44. A valve operator as defined in claim 43 wherein said second bias transmitting and transforming means comprise:
(1) quarter turn torque arm generating means which produce a substantially quarter turn output motion for actuating said quarter turn valve member;
(2) said varying torque arm generating means connect to said quarter turn torque arm means and enable said first bias from said spring actuating means to act through decreasing torque arm means which generate increasing leverage.

45. A valve operator as defined in claim 44 wherein:
(A) said quarter turn torque arm generating means comprise a quarter turn first arm link;
(B) said varying torque arm generating means comprise:
(1) a second arm link;
(2) a connecting link which is rotatably connected to said second arm link;
(C) said connecting link is rotatably connected to said quarter turn first arm link thereby forming a four bar linkage.

46. A valve operator as defined in claim 45 wherein said four bar linkage comprises a substantially symmetric four bar linkage.

47. A spring return valve actuator for use in a valve operator for operating a quarter turn valve member, comprising:
(A) rigid supporting means which are mounted to a quarter turn valve member;
(B) spring actuating means which are mounted to said rigid supporting means;
(C) bias transmitting and transforming means;
(D) said spring actuating means connect to said bias transmitting and transforming means which thence connect to a quarter turn valve member;
(E) said bias transmitting and transforming means comprise a substantially symmetric four bar linkage which generates a substantially increasing leverage for said spring actuating means to act through when actuating said quarter turn valve member.

48. A valve actuator as defined in claim 47 wherein said spring actuating means comprise torsion spring actuating means.

49. A valve actuator as defined in claim 47 wherein said spring actuating means comprise nested torsion spring actuating means.

* * * * *

UNITED STATES PATENT AND TRADEMARK OFFICE
CERTIFICATE OF CORRECTION

PATENT NO. : 4,869,459

DATED : Sep. 26, 1989

INVENTOR(S) : Douglas A. Bourne

It is certified that error appears in the above-identified patent and that said Letters Patent is hereby corrected as shown below:

Col. 3, line 9, change "returned" to -retained-;
Col. 4, line 22, change "device" to -devices-;
Col. 15, line 20, change "as" to -so-;
Col. 15, line 23, change "laod" to -load-;
Col. 15, line 48, change "Hook's" to -Hooke's-;
Col. 15, line 52, "M=kθ" could be mistaken for M=kθk, insert more space between "M=kθ" and "k - spring rate";
Col. 17, line 31, change "<0<k<1" to -0<k<1- and change "actuatiion" to -actuation-;
Col. 22, line 31, change "finished" to -finishes-;
Col. 22, line 41, change "sad" to -said-;
Col. 22, line 51, change "controller" to -controlled-;
Col. 22, line 53, change "fthe" to -the-;
Col. 23, line 26, change "quater" to -quarter-;
Col. 23, line 53, change "B2=B2" to -B1=B2-;
Col. 24, line 5, after "Given" delete "of";
Col. 24, line 34, change "[al/bl]" to -[a1/b2]-;
Col. 28, line 47, change the first "Second" to -Said-;
Col. 29, line 11, change "retate" to -rotate-;
Col. 29, line 59, change "should" to -said-;
Col. 32, line 22, change "he" to -the-;
Col. 32, line 51, change "bransmitting" to -transmitting-;
Col. 38, line 10, change "spoolng" to -spooling-.

UNITED STATES PATENT AND TRADEMARK OFFICE
CERTIFICATE OF CORRECTION

PATENT NO. : 4,869,459

DATED : September 26, 1989

INVENTOR(S) : Douglas A. Bourne

It is certified that error appears in the above-identified patent and that said Letters Patent is hereby corrected as shown below:

```
Col.  5, line 22, after "25%" delete one "of";
Col. 12, line 34, after "double dee" delete one "shaft";
Col. 12, line 38, after "circles" delete one "between said";
Col. 25, line 65, after "springs" insert -335 and 334,-;
Col. 38, line 59, after "operating" delete one "a";
Col. 39, line  9, change indexing letter "(E)" to -(F)-;
Col. 39, line 19, change indexing letter "(F)" to -(G)-;
Col. 39, line 20, after "bias to" delete one "said".
```

Signed and Sealed this

Twentieth Day of November, 1990

Attest:

HARRY F. MANBECK, JR.

Attesting Officer

Commissioner of Patents and Trademarks